United States Patent
Srinivasaraghavan et al.

(10) Patent No.: US 10,362,362 B2
(45) Date of Patent: Jul. 23, 2019

(54) MULTI-DIMENSIONAL HIERARCHICAL CONTENT NAVIGATION

(71) Applicant: Verizon Patent and Licensing Inc., Arlington, VA (US)

(72) Inventors: Haripriya Srinivasaraghavan, Plano, TX (US); Lakshmi N. Chakarapani, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 318 days.

(21) Appl. No.: 14/793,819

(22) Filed: Jul. 8, 2015

(65) Prior Publication Data
US 2017/0010788 A1    Jan. 12, 2017

(51) Int. Cl.
*G06F 3/0484* (2013.01)
*H04N 21/482* (2011.01)
*H04N 21/472* (2011.01)

(52) U.S. Cl.
CPC ..... *H04N 21/4828* (2013.01); *H04N 21/4826* (2013.01); *H04N 21/472* (2013.01)

(58) Field of Classification Search
None
See application file for complete search history.

(56) References Cited

U.S. PATENT DOCUMENTS

| | | | | |
|---|---|---|---|---|
| 8,830,225 B1 * | 9/2014 | Karakotsios | ............... | G06T 3/60 345/419 |
| 2002/0032696 A1 * | 3/2002 | Takiguchi | ........... | G06F 16/9024 715/255 |
| 2007/0174108 A1 * | 7/2007 | Monster | ............... | G06Q 10/107 705/7.32 |
| 2009/0288006 A1 * | 11/2009 | Audet | ................. | G06F 17/2205 715/716 |
| 2011/0066970 A1 * | 3/2011 | Burrier | .................. | G06Q 30/02 715/782 |
| 2011/0154235 A1 * | 6/2011 | Min | ...................... | G06F 3/0482 715/769 |
| 2011/0307832 A1 * | 12/2011 | Audet | ................. | G06F 17/2205 715/828 |
| 2011/0316884 A1 * | 12/2011 | Giambalvo | ....... | G06F 17/30058 345/660 |
| 2012/0204108 A1 * | 8/2012 | Audet | ................. | G06F 17/2205 715/716 |
| 2013/0111526 A1 * | 5/2013 | Glowaty | ........... | G06F 17/30817 725/53 |

(Continued)

*Primary Examiner* — Tuan S Nguyen

(57) ABSTRACT

A device includes a display unit that displays a tile display comprising multiple rows and columns of tiles upon a display unit of a device, wherein each of the tiles represents an item of content or a group of items of content. The device associates multiple different linear axes with the tile display, wherein the multiple different linear axes intersect at a center tile of the tile display and wherein multiple different properties are associated with the center tile. The device receives user input associated with selecting one of the linear axes of the tile display; identifies a search parameter based on the selected one of the linear axes and based on at least one of the multiple different properties associated with the center tile; and causes the tile display to include search results resulting from a search of the content catalog with the identified search parameter.

20 Claims, 29 Drawing Sheets

(56) References Cited

U.S. PATENT DOCUMENTS

| | | | |
|---|---|---|---|
| 2013/0219326 A1* | 8/2013 | Burrier | G06F 3/0484 715/780 |
| 2014/0085237 A1* | 3/2014 | Choi | G06F 3/04883 345/173 |
| 2014/0181712 A1* | 6/2014 | Lucero | G01C 21/36 715/765 |
| 2014/0337791 A1* | 11/2014 | Agnetta | G06F 3/0481 715/784 |
| 2017/0123590 A1* | 5/2017 | Han | G06F 3/0418 |

* cited by examiner

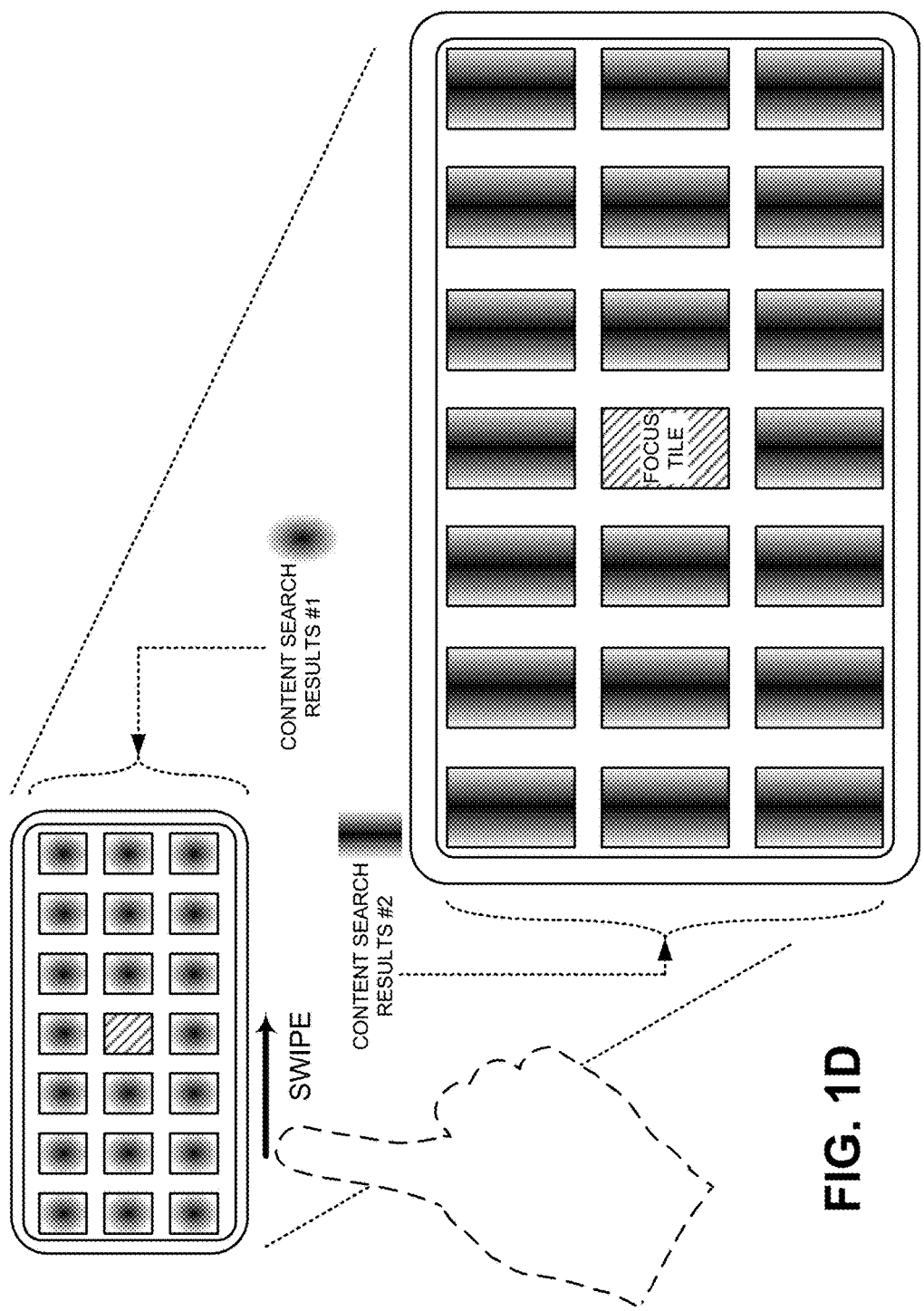

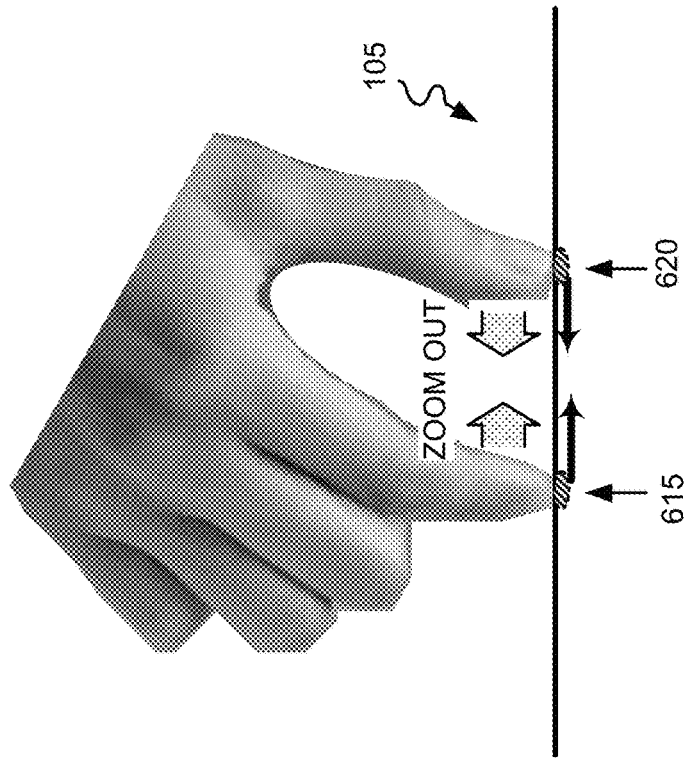
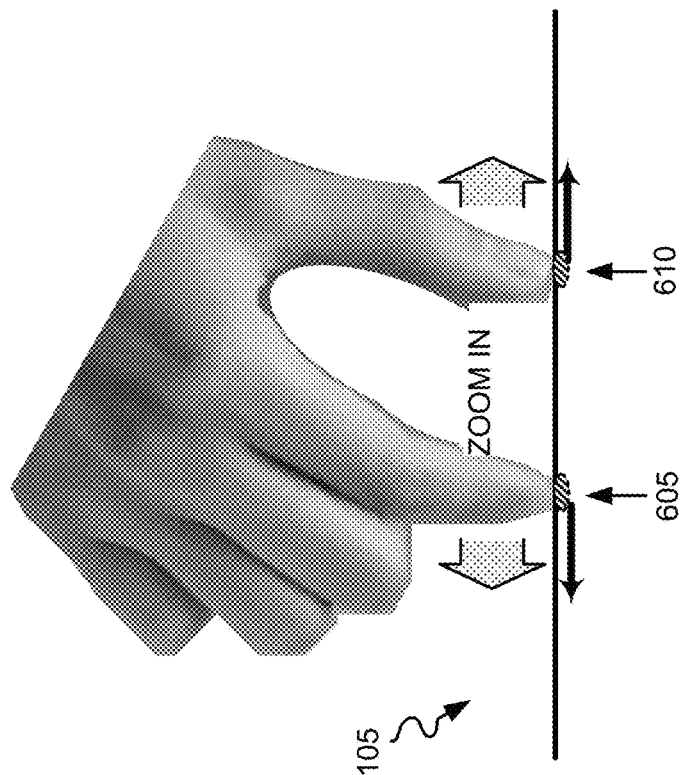

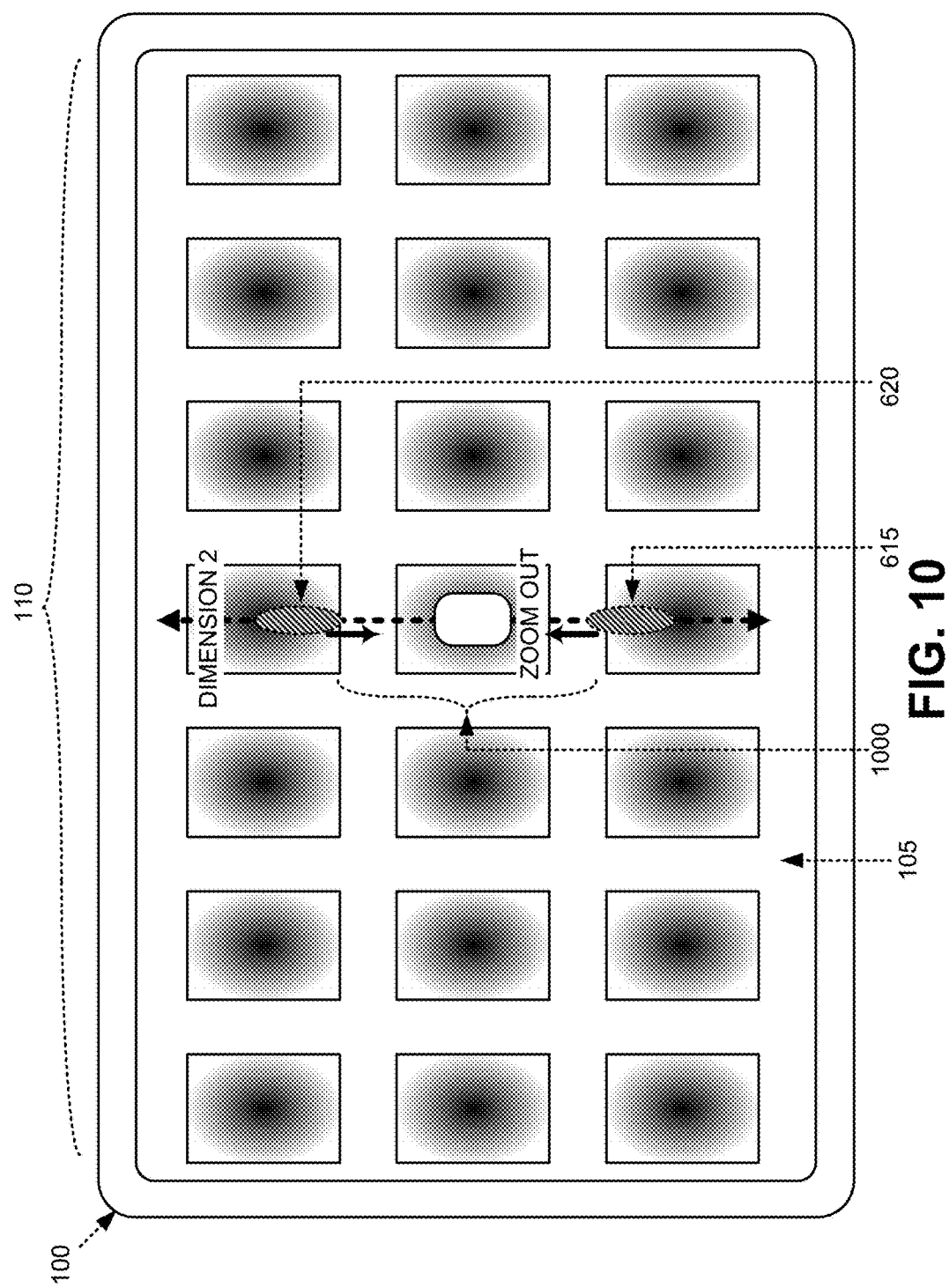

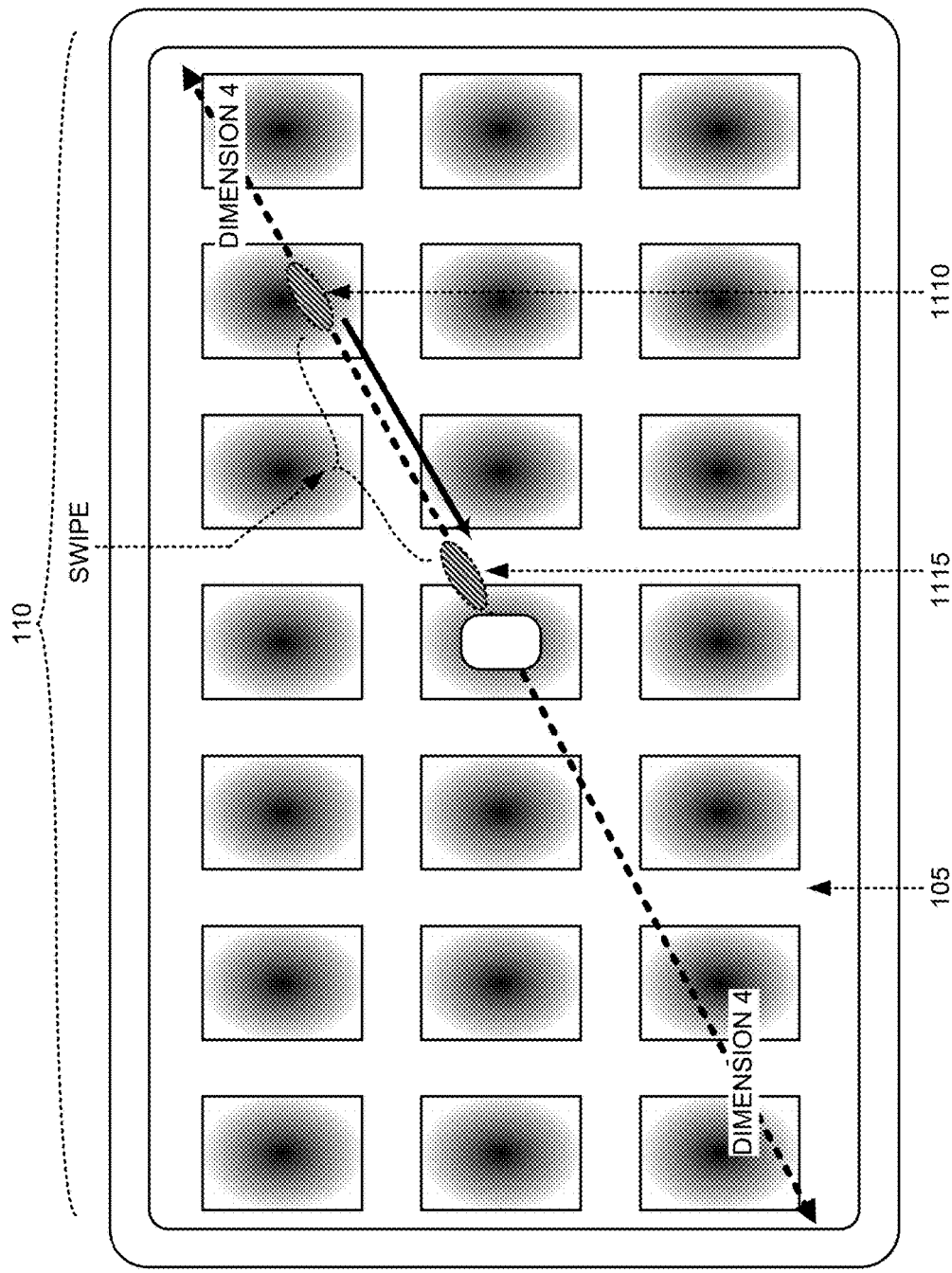

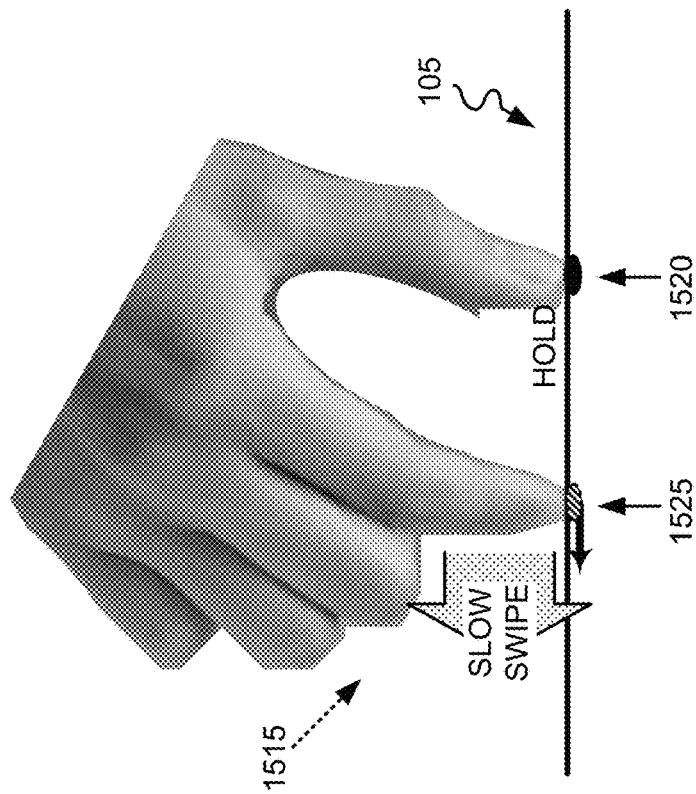
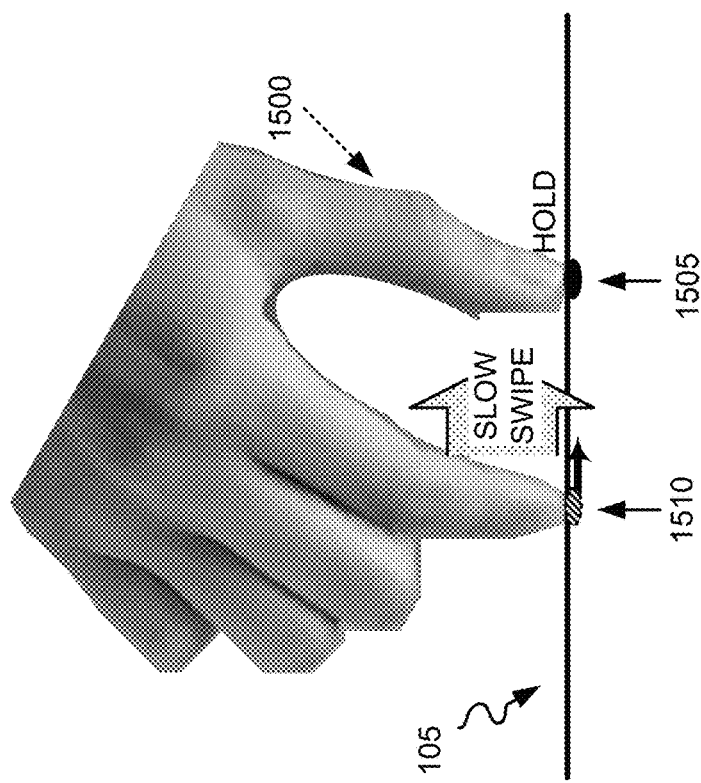

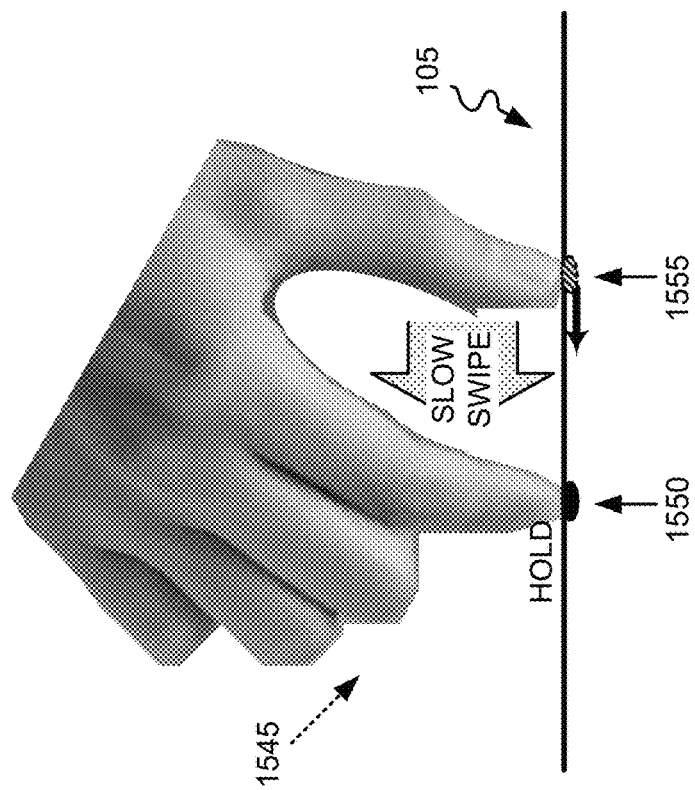
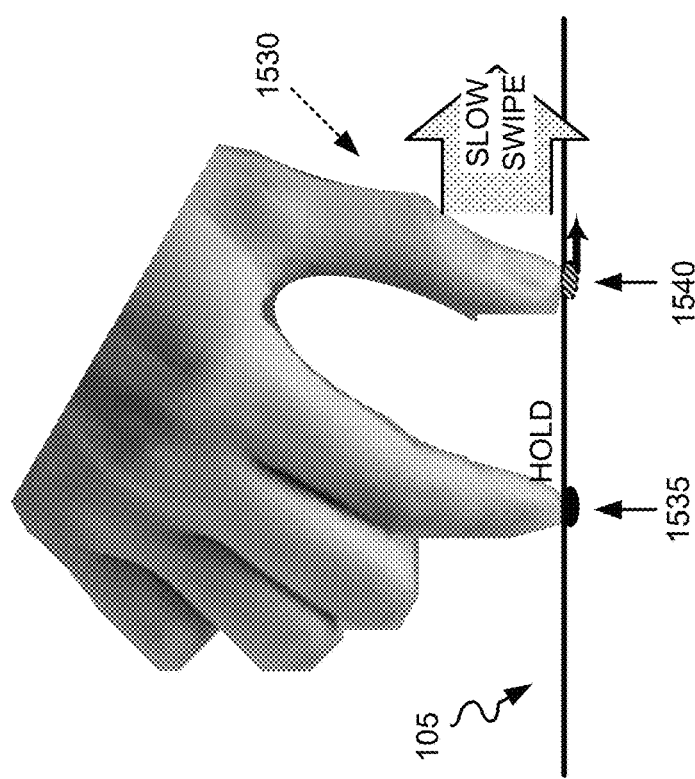

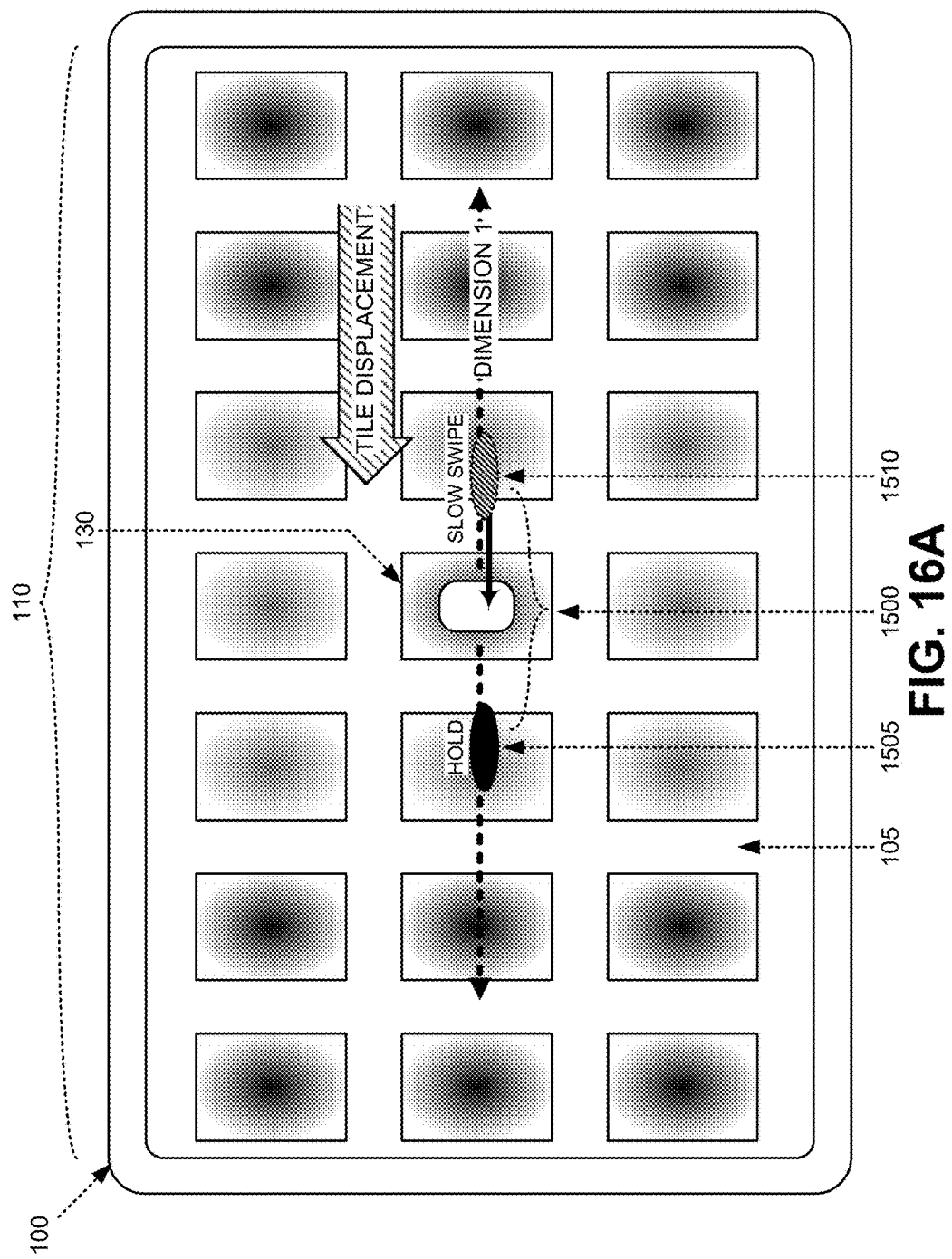

MULTI-DIMENSIONAL HIERARCHICAL CONTENT NAVIGATION

BACKGROUND

Content delivery networks (CDNs) are interconnected systems of servers that can rapidly and cost effectively deliver a variety of digital content to numerous end points, such as web browsers, mobile devices, set-top boxes and gaming consoles, via the Internet. CDNs include large distributed systems of servers located in multiple data centers in the Internet. CDN nodes are typically deployed in multiple different locations, often across multiple different backbones. The number of nodes and servers of a CDN varies, depending on the CDN's architecture. CDNs serve a substantial portion of content on the Internet, including text, graphics, Uniform Resource Locators (URLs), scripts, media files, software, documents, applications, social networks, and streaming media.

For serving content via streaming media, CDNs may, for example, use Hypertext Transfer Protocol (HTTP) Live Streaming (HLS). HLS is a HTTP-based media streaming communications protocol that involves breaking the media stream into a sequence of file downloads. Each file may be downloaded as one portion of a transport stream. Each downloaded file may be played in sequence to present a continuous media stream. As a given stream is played, the client may choose from multiple different alternative streams containing the same content encoded at various data rates. At the beginning of a streaming session, the client downloads a playlist file that specifies the different or alternate streams that are available.

In HLS, a given multimedia presentation is specified by a Uniform Resource Identifier (URI) that corresponds to the playlist file associated with the multimedia presentation. The playlist itself includes an ordered list of media URIs and informational tags. Each media URI refers to a media file that is a segment of a single continuous media stream. To play a stream, a client first obtains the playlist file and then obtains and plays each media file in the playlist in sequence.

Over-the-top (OTT) services involve services, which deliver audio, video, data, voice and other media, that ride on top of an existing network service provided by a network operator, where the OTT services don't require any business or technology affiliations with the network operator. For example, televisions (TVs), Digital Video Disk (DVD) players and video game consoles are being built with wireless connectivity such that they can "piggyback" on an existing wireless network and pull content from the Internet. OTT services are likely to have a significant role in the proliferation of Internet television and Internet-connected TVs.

BRIEF DESCRIPTION OF THE DRAWINGS

FIG. 1D depicts the selection of a search parameter by a user and the subsequent display of content search results, in the tile display, that result from the search of content;

FIGS. 6A-10 depict examples of user input for "zooming in" and "zooming out" upon the tile display of FIG. 1A according to an implementation in which the display unit is a touch screen display;

FIGS. 11A-14 depict examples of user input for selecting a search parameter corresponding to a search dimension according to an implementation in which the display unit of the device is a touch screen display;

FIGS. 15A-15D, 16A and 16B depict examples of user inputs for performing a "panning" operation upon the tile display of the device according to an implementation in which the display unit of the device is a touch screen display;

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

Video content is available from multiple sources and in multiple formats. For example, content is available in linear, on-demand and pay-per-view formats. A specific program or title typically does not exist in isolation, but is related to other content in terms of grouping (TV series, prequels, sequels), by genre and mood, by cast and crew, by time period, by topic, and so on. Users have too many options to choose from when it comes to the sources and types of content to listen to and/or watch. Many television and OTT provides provide personalized recommendations to users to make the job of navigating through, and selection of, content easier. The problem with such recommendations is that one size does not fit all. Some users like to watch content that is similar in topic or genre, some users like to watch content from a same period of time, some users prefer to watch content by their favorite director or writer, and other users are satisfied with watching content that is available for playback right now. It is often frustrating for a user to be presented with a series of recommendations that are not interesting or relevant. Users also do not typically like to answer a series of questions, or run through many account settings or interface options, to tell the recommending system about what content that the user prefers.

Embodiments described herein allow the user to change a dimension, or the direction of the recommendation content, to dynamically influence the way the recommendations are generated and to enable the user to easily navigate through the content to reach preferred content. A technique for multi-dimensional hierarchical content navigation is described herein that gives the user control over navigation through recommended content in a way that is quick, intuitive and predictable.

Figure 1A:
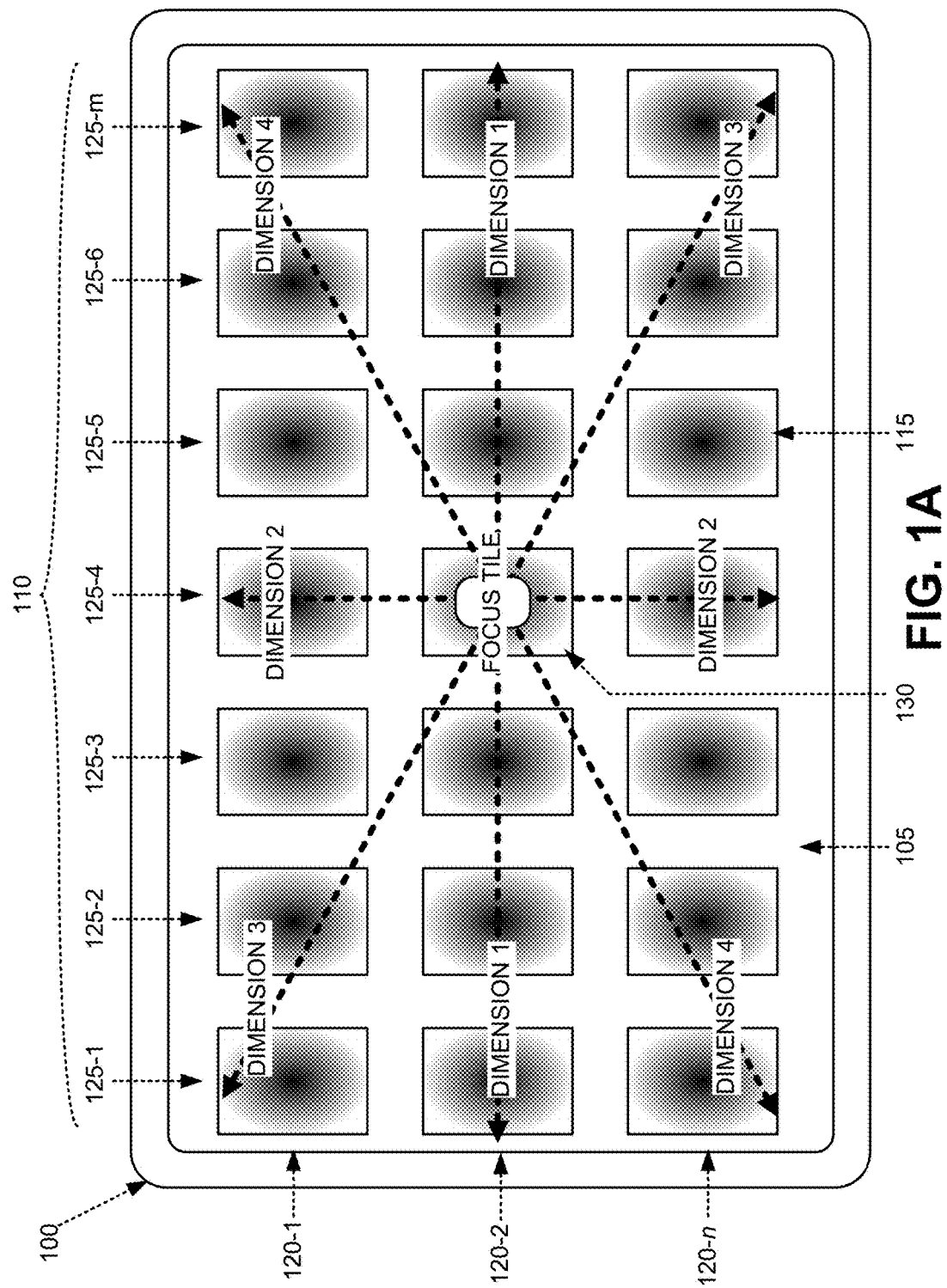
FIG. 1A depicts an overview of multidimensional hierarchical navigation of content via a device.

FIG. 1A depicts an overview of multidimensional hierarchical navigation of content via a device 100. As shown, device 100 may include a display unit 105 that presents a tile display 110 that includes an arrangement of tiles 115, where each tile 115 represents an icon/image associated with an item of content, or with a group of items of content. For example, a tile 115 may include an image associated with a particular movie, and the tile represents that movie. The tile display 110 displays tiles associated with content that is being recommended to the user of device 100. "Content," as referred to herein, may include any type of digital media, such as, for example, image media, audio only media, video only media, or audio and video combined media (commonly referred to as just "video'). The user (not shown) of device 100 may perform various actions relative to tile display 110, as described in further detail below, to cause content that is most of interest to the user to be displayed within tile display 110.

As shown in FIG. 1A, tile display 110 includes multiple rows 120-1 through 120-n and columns 125-1 through 125-m of tiles, with a center "focus tile" 130 that represents the tile currently setting the context for a search of content to locate the content of most interest to the user. As shown in FIG. 1A, focus tile 130 may be placed at the center of tile display 110, and may maintain that center location as the surrounding tiles are updated and/or refreshed. "Context," as referred to herein, includes a set of properties, associated with focus tile 130 that are used for searching for content in a content catalog to identify other content that is similar to, or has some relationship with, the content corresponding to the focus tile 130. Multiple different search dimensions are associated with multiple different linear axes of tile display 110, where each search dimension is assigned a searchable parameter for searching based on a corresponding property of focus tile 130. For example, dimension 1, dimension 2, dimension 3 and dimension 4 are depicted in FIG. 1A, where dimension 1 resides along a horizontal linear axis crossing through row 120-2 of tile display 110 and horizontally intersecting focus tile 130, dimension 2 resides along a vertical linear axis crossing through column 125-4 of tile display 110 and vertically intersecting focus tile 130, dimension 3 resides along a diagonal linear axis that extends from the tile in the upper left corner of tile display 110 (i.e., at row 120-1 and column 125-1) and extends to the tile in the bottom right corner of tile display 110 (i.e., row 120-n and column 125-m) while diagonally intersecting focus tile 130, dimension 4 resides along a diagonal linear axis that extends from the tile in the upper right corner of tile display 110 (i.e., at row 120-1 and column 125-m) and extends to the tile in the bottom left corner of tile display 110 (i.e., row 120-n and column 125-1) while diagonally intersecting focus tile 130. Various types of user input, described further below, may be received at device 100 to select one or more of the dimensions (e.g., dimension 1, dimension 2, dimension 3 or dimension 4) for performing a search of the content to locate content of the most interest to the user for recommending to the user. For example, if display unit 105 is a touch screen display, then a finger swipe along dimension 1 from the right side of dimension 1 towards a left side of dimension 1 may cause a search of content to be performed that looks for content that has an older release date than the original release date(s) associated with the content of focus tile 130. The search results displayed via tile display 110 may include tiles associated with content recommended to a user based on the user's interaction with tile display 110. User interaction with tile display 110, in this exemplary implementation, represents navigating through user preferences to filter and/or reduce the recommendation space such that the user may obtain a set of tiles associated with recommended content that is of the most interest to the user.

Figure 1B:
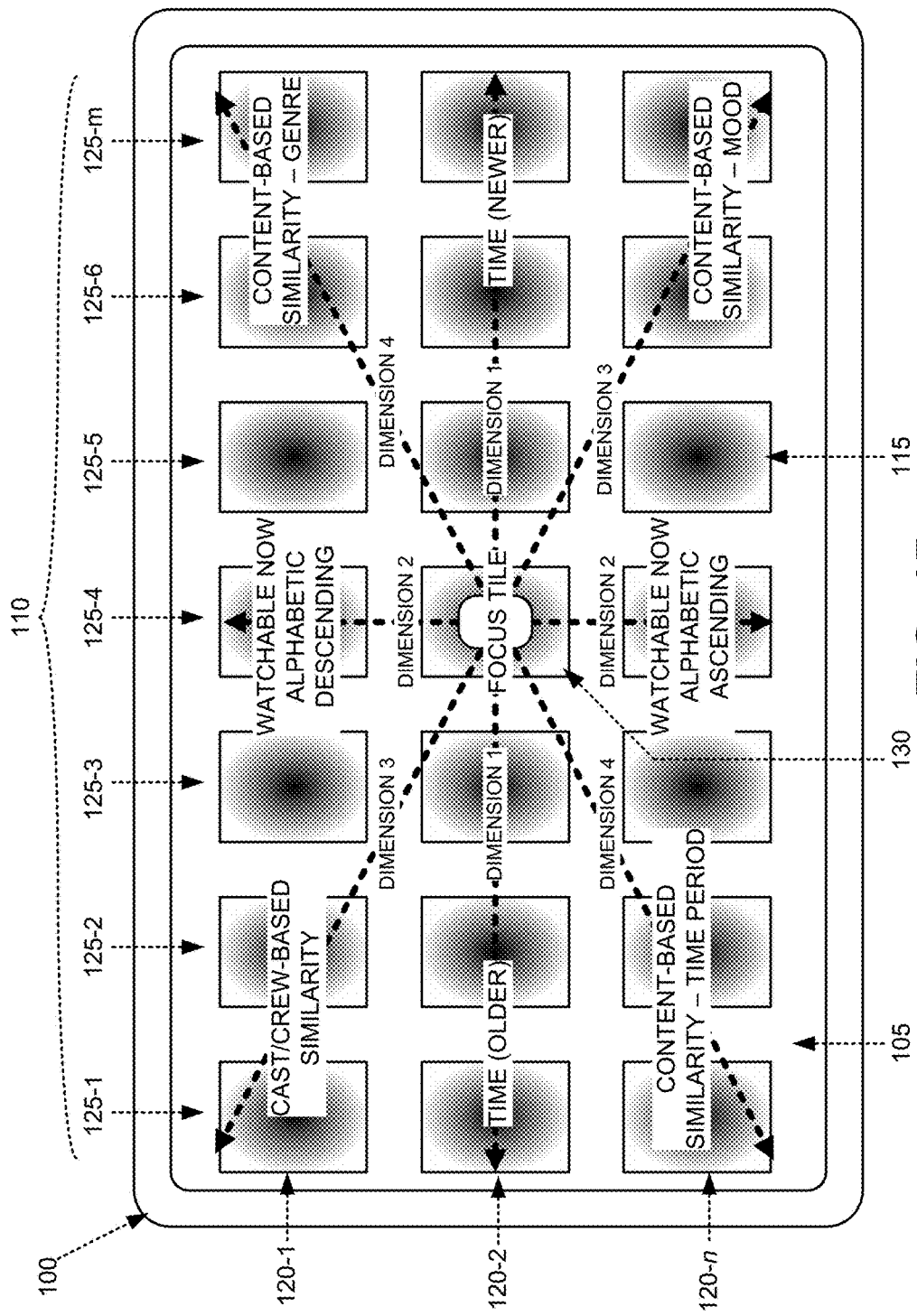
FIG. 1B depicts an example of search parameters assigned to the specific dimensions of the tile display of FIG. 1A.

FIG. 1B depicts an example of search parameters assigned to the specific dimensions (e.g., dimension 1, dimension 2, dimension 3 and dimension 4) of FIG. 1A. In one implementation, the dimensional/search parameter assignments depicted in FIG. 1B may be default assignments which may be customizable (as described with respect to FIG. 18 below). Each of the specific dimensions of FIG. 1A may have two different search parameters associated with it—one search parameter associated with a right-to-left swipe, or bottom-to-top swipe, along the dimension and another search parameter associated with a left-to-right swipe, or a top-to-bottom swipe, along the dimension.

As shown in this example, a leftwards swipe along dimension 1 (from a right side of display unit 105 horizontally towards a left side of display unit 105 through row 120-2) is assigned a search parameter of "older in time." If the "older in time" search parameter is selected by the user (via a leftwards swipe along dimension 1), the original release date of the content associated with focus tile 130 is compared with the original release date of other stored content to identify the other stored content having an older original release date. A rightwards swipe along dimension 1 (from a left side of display unit 105 horizontally towards a right side of display unit 105 through row 120-2) is assigned a search parameter of "newer in time." If the "newer in time" search parameter is selected by the user (via a rightwards swipe along dimension 1), the original release date of the content associated with focus tile 130 is compared with the original release date of other stored content to identify the other stored content having a newer original release date.

In the exemplary dimension/search parameter assignment of FIG. 1B, an upwards swipe along dimension 2 (from a bottom side of display unit 105 vertically towards an upper side of display unit 105 through column 125-4) is assigned a search parameter of "watchable now, alphabetic descending." If the "watchable now, alphabetic descending" search parameter is selected by the user (via an upwards swipe along dimension 2), all content that is available and watchable now is displayed via tile display 110 in alphabetic descending order (i.e., alphabetically descending from the left to right, and from top to bottom, in tile display 110). A downwards swipe along dimension 2 ((from a upper side of display unit 105 vertically towards a lower side of display unit 105 through column 125-4) is assigned a search parameter of "watchable now, alphabetic ascending." If the "watchable now, alphabetic ascending" search parameter is selected by the user (via a downwards swipe along dimension 2), all content that is available and watchable now is displayed via tile display 110 in alphabetic ascending order (i.e., alphabetically ascending from the left to right, and from top to bottom, in tile display 110).

A leftwards swipe along dimension 3 (diagonally upwards from a lower right side of display unit 105 towards an upper left side of display unit 105) is assigned a search parameter of "cast and crew-based similarity." If the "cast and crew-based similarity" search parameter is selected by the user (via a diagonally upwards right-to-left swipe along dimension 3), the "cast and crew" information of the content associated with focus tile 130 is compared with the cast and crew information of other stored content to identify the other stored content having one or more of the same cast and/or crew. A rightwards swipe along dimension 3 (diagonally downwards from an upper left side of display unit 105 towards a lower right side of display unit 105) is assigned a search parameter of "content-based similarity—mood." If the "content-based similarity—mood" search parameter is selected by the user (via a diagonally downwards left-to-right swipe along dimension 3), the "mood" information (e.g., exciting, suspenseful, ominous, dark, understated, cerebral, witty, scary, violent, mind-bending, imaginative, etc.) of the content associated with focus tile 130 is compared with the "mood" information of other stored content to identify the other stored content having the same or similar mood information associated with it.

A rightwards swipe along dimension 4 (diagonally upwards from a lower left side of display unit 105 towards an upper right side of display unit 105) is assigned a search parameter of "content-based similarity—genre." If the "content-based similarity—genre" search parameter is selected by the user (via a diagonally upwards left-to-right swipe along dimension 4), the "genre" information of the content associated with focus tile 130 is compared with the genre information of other stored content to identify the other stored content being of the same genre. A leftwards swipe along dimension 4 (diagonally downwards from an upper right side of display unit 105 towards a lower left side of display unit 105) is assigned a search parameter of "content-based similarity—time period." If the "content-based similarity—time period" search parameter is selected by the user (via a diagonally downwards swipe along dimension 4), the time period associated with the content of focus tile 130 is compared with the time period associated with the subject matter of the other stored content to identify the other stored content having a same time period associated with it.

Figure 1C:
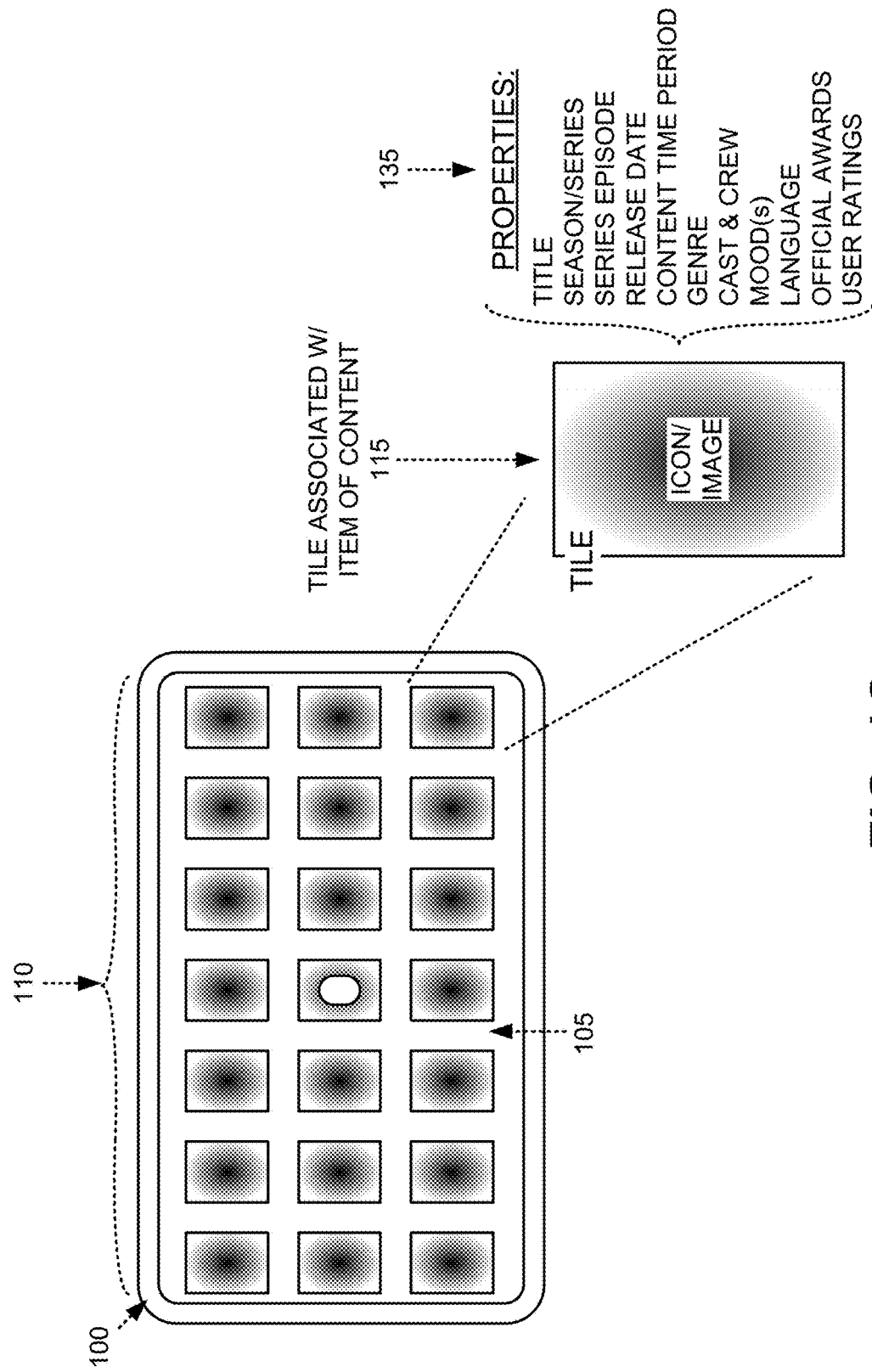
FIG. 1C depicts details of a tile of a tile display displayed via the display unit of the device of FIG. 1A.

FIG. 1C depicts details of a tile 115 of a tile display 110 displayed via display unit 105 of device 100. As shown, tile 115 includes a representative icon and/or image associated with the content which tile 115 represents. Tile 115 may represent a single item of content or tile 115 may represent a group of items of content depending on the focus level of tile display 110 (described further below). For example, tile 115 may include an image or icon associated with a single movie or a single episode of a program series, and may additionally include text associated with the image or icon (e.g., a title). If tile 115 represents a group of items of content, tile 115 may include an image or icon associated generally with the entire group of items of content. For example, tile 115 may represent a group of items of content, all of which are "horror" movies. As another example, tile 115 may represent a group of items of content, all of which were originally released during the 1960s.

Each tile 115 may be associated with a set of properties, where the set of properties include multiple items of data that describe the content associated with tile 115. For example, the properties associated with tile 115 may include a title (e.g., movie title, series title), a season and/or series identifier, a series episode number and/or title, an original release date, a content time period, a genre, cast and crew information, mood information, language information, official awards information, and user ratings. The title may include an official title of the movie or program series (e.g., "Jaws" or "Happy Days"). The season and/or series identi-fier may identify the number of the season or series of which the program series is a part (e.g., season 3 of "Happy Days"). The series episode number may identify the sequential number of the program episode within a particular season and/or a title of the program episode (e.g., episode 12 of season 3 of "Happy Days," entitled "Fonzie's New Friend"). The original release date includes the date that the movie or program episode was originally released in theaters, or originally broadcast on television (e.g., broadcast television, cable television, or streaming media subscription services). The content time period identifies a time period associated with the subject matter of the movie or program episode. For example, the content time period of the television program "Happy Days" would be the 1950s.

The genre may identify one or more genres that characterize the subject matter of the movie, series, or program episode. The genre may include, but is not limited to, one or more of drama, science fiction, horror, thriller, western fiction, action, adventure, comedy, crime, fantasy, historical, historical fiction, mystery, political, romance, satire, and animated. Other genres not listed, and sub-genres of the listed genres or other genres, may also be identified in the genre properties of tile 115. The cast and crew information may identify various different cast and crew associated with the movie, or the program episode. The cast and crew information may include, for example, names of actors, the director(s), the producer(s), the cinematographer(s), make-up artist(s), etc. The mood information may identify one or more moods associated with the subject matter of the movie or program episode. The mood information may include, but is not limited to, exciting, suspenseful, ominous, dark, understated, cerebral, witty, scary, violent, mind-bending, and/or imaginative.

The language information may identify the language spoken during the movie or program episode and the language(s) of any sub-titles available for the movie or program episode. The official awards information identifies any official awards awarded to the movie, program series, or program episode such as, for example, Oscars, Emmys, etc. The user ratings may include a cumulative rating given by viewers of the content. For example, the user ratings may include a 1 to 5 star rating system, where the user ratings received from multiple different viewers is averaged to obtain a cumulative rating. The cumulative rating may also be associated with the number of viewers who rated the content. In one specific example, a movie may have a cumulative rating of 3.3 in a 1 to 5 star rating system, with 4,579 viewers rating the movie.

Each tile 115 of tile display 110 displayed via display unit 105 of device 100 includes a different icon and/or image associated with a different item of content, or a different group of items of content. Each tile 115 is further associated with a different set of properties for the item of content, or the group of items of content.

Upon receipt of user input via display unit 105 selecting a search parameter, tile display 110 is re-populated (i.e., refreshed) with tiles 115 corresponding to the content of the search results resulting from a search of the content of the content catalog. The property of focus tile 130 that corresponds to the selected search parameter may be used as the basis for performing the search of the content. For example, if focus tile 130 represents the movie "Jaws" and the search parameter selected by the user is "content-based similarity—genre," then the genre property of "Thriller" associated with the movie "Jaws" can be used as the basis for performing a search of content to retrieve tiles associated with other content that has a genre property that is also "thriller." Upon completion of the search, the tiles of tile display 110, except for focus tile 130, are re-populated (i.e., refreshed) with the retrieved tiles associated with the content search results that also have a genre property of "thriller." FIG. 1D depicts the selection of a search parameter by a user ("swipe") while first content search results, along with a focus tile, are displayed in tile display 110, and the subsequent display of second content search results that result from the search of the content, along with the same focus tile, in tile display 110.

Figure 2:
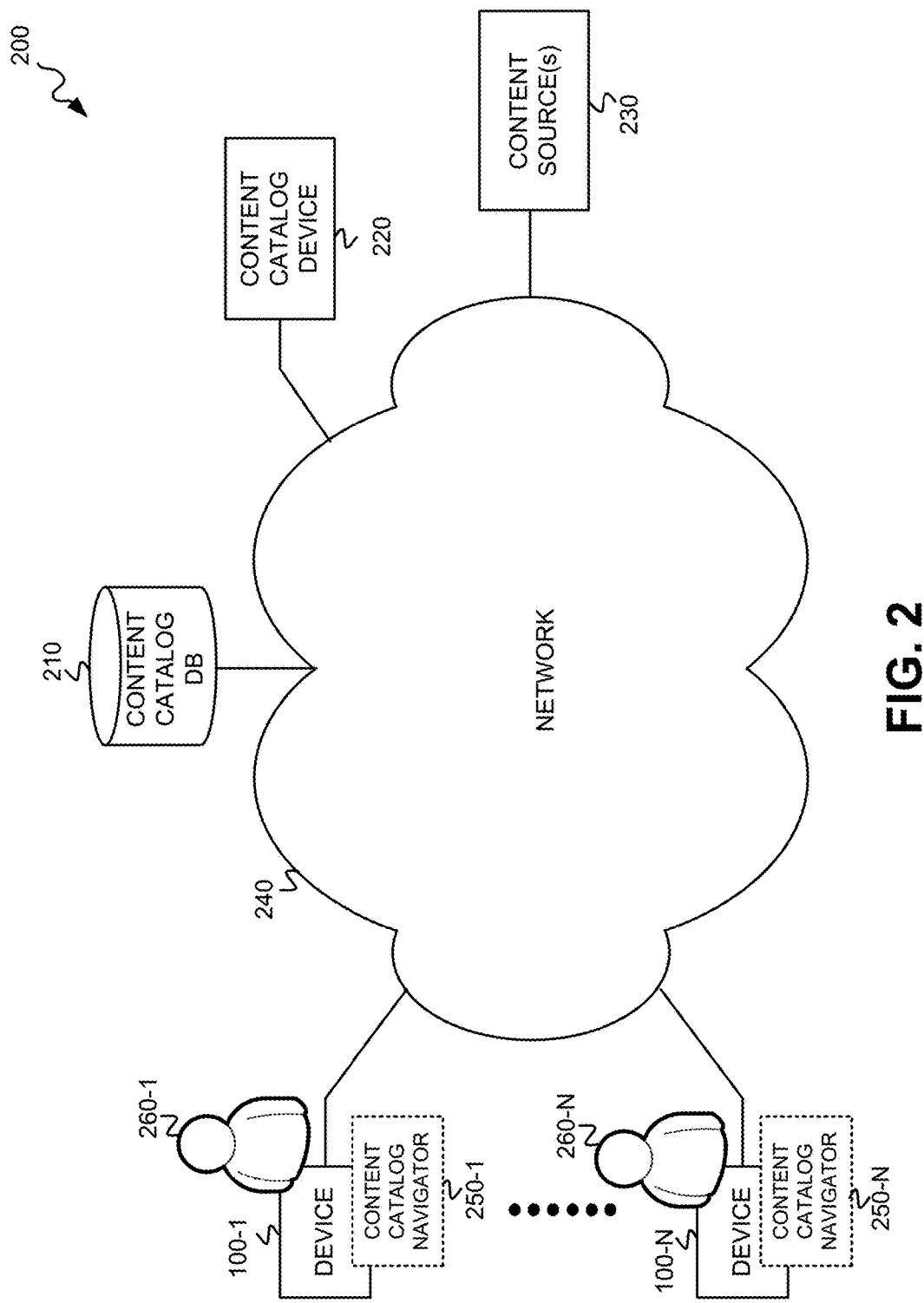
FIG. 2 depicts an exemplary network environment in which content may be searched to provide search results and/or recommended content to one or more users.

FIG. 2 depicts an exemplary network environment 200 in which content may be searched to provide search results and/or recommended content to one or more users. As shown, network environment 200 may include multiple devices 100-1 through 100-N, a content catalog database (DB) 210, a content catalog device 220, a content source(s) 230 and a network 240.

Devices 100-1 through 100-N (generically and individually referred to herein as "device 100," or collectively referred to here as "devices 100") may each include any type of electronic device that further includes communication functionality that enables it to communicate with content catalog DB 210, content catalog device 220 and/or content source(s) 230 via network 240. A respective one of users 260-1 through 260-N (generically and individually referred to herein as "user 260," or collectively referred to here as "users 260") may be associated with one of devices 100-1 through 100-N, where each user 260 uses the respective device 100 for accessing content stored at content source(s) 230. Each of devices 100-1 through 100-N may additionally include a media player for presenting and/or playing media received from content source(s) 230. As shown in FIG. 2, each of devices 100-1 through 100-N may also store and execute a respective content catalog navigator 250-1 through 250-N that enables a respective user 260 to navigate and/or search through a content catalog stored in content catalog DB 210 to obtain relevant search results or recommended content. Device 100 may include, for example, a cellular radiotelephone, (e.g., a smart phone); a personal digital assistant (PDA), a gaming device, a media player device, a palmtop or tablet computer, a surface table with touch screen display, a wearable computer (e.g., in the form of a watch or glasses), or a digital camera. In some exemplary embodiments, device 100 may include a hand-held electronic device. In one implementation, device 100 may include a device having a projected display with, for example, a projected user interface. In some implementations, device 100, along with content catalog navigator 250 (e.g., as an "app" installed on device 100), may operate as a "second screen" remote device for use in conjunction with a television or set-top box (STB).

Content catalog DB 210 may include a network device that stores one or more databases that may be accessed by external devices for storage and retrieval of a content catalog(s) that further includes data related to content stored at content source(s) 230. The content catalog(s) may include various data that describes the content stored at content source(s) 230. For example, the content catalog may, for each item of content, store the properties described above with respect to FIG. 1C. In addition to the properties described with respect to FIG. 1C, the content catalog may store, for each item of content, an icon or image for use as a tile in tile display 110. Content catalog DB 210 may store data as various different types of data structures including, for example, a tree-based data structure. Each of the various dimensions of tile display 110 of FIG. 1A may be associated with a different branch of the tree-based data structure, and different sub-dimensions of the dimensions may be associated with different sub-branches of the branches of the tree-based data structure.

Content catalog device 220 may include a network device that performs searches of the content catalog(s) stored at content catalog DB 210 based on communications from content catalog navigators 250 of devices 100. Content catalog device 220, upon completion of a search of the content catalog(s), may return search results (e.g., the display 110) to device 100.

Content source(s) 230 may include one or more network devices that deliver content to devices 100. The content may include any type of digital media, such as, for example, image media, audio only media, video only media, or audio and video combined media (commonly referred to as just "video"). The audio, video, and video/audio media may be delivered using various network delivery methods and mechanisms, including delivery as streaming media (e.g., via HLS).

Network 240 may include one or more networks of any type including, for example, a wireless public land mobile network (PLMN) (e.g., a Code Division Multiple Access (CDMA) 2000 PLMN, a Global System for Mobile Communications (GSM) PLMN, a Long Term Evolution (LTE) PLMN and/or other types of PLMNs), a telecommunications network (e.g., Public Switched Telephone Networks (PSTNs)), a local area network (LAN), a wide area network (WAN), a metropolitan area network (MAN), an intranet, the Internet, a cable network (e.g., an optical cable network), or a satellite network. Components of network 240 may, for example, serve as a content delivery network (CDN) for delivering content (e.g., media) from content source(s) 230 to devices 100-1 through 100-N. Network 240 may enable devices 100-1 through 100-N to communicate with content catalog DB 210, content catalog device 220 and/or content source(s) 230 to retrieve content search results or recommended content based on the content catalog(s) stored at content catalog DB 210, and to access and obtain content stored at content source(s) 230.

The configuration of network components of network environment 200 illustrated in FIG. 2 is for illustrative purposes. Other configurations may be implemented. Therefore, network environment 200 may include additional, fewer and/or different components that may be configured in a different arrangement than that depicted in FIG. 2. For example, a single content catalog DB 210 and a single content catalog device 220 are depicted in FIG. 2. Network environment 200, however, may include multiple different content DBs 210 and multiple different content catalog devices 220.

Figure 3:
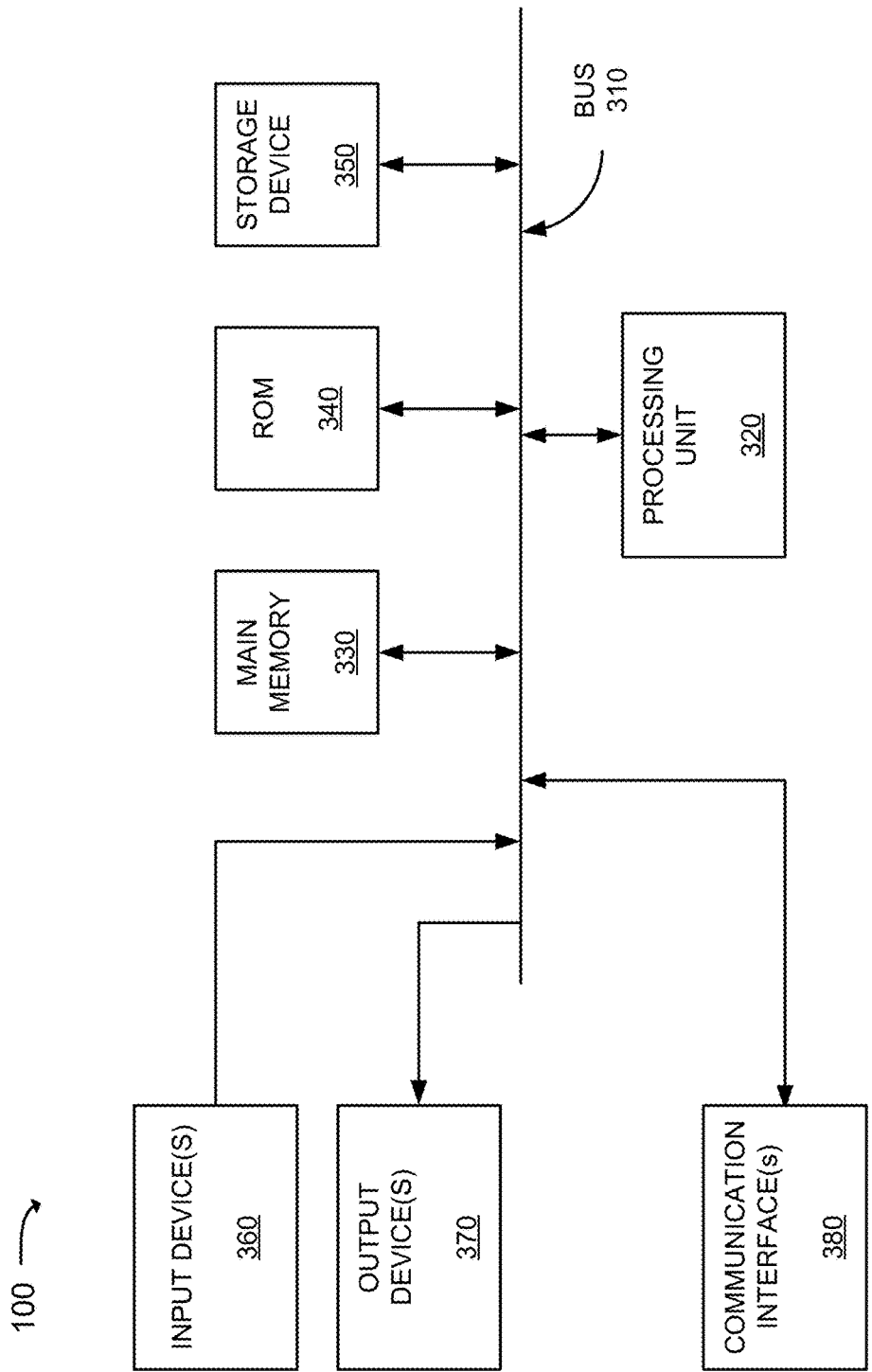
FIG. 3 is a diagram that depicts exemplary components of the device of FIG. 1A.

FIG. 3 is a diagram that depicts exemplary components of device 100. Content catalog DB 210, content catalog device 220 and/or content source(s) 230 may be configured the same as, or similar to, the configuration of device 100 depicted in FIG. 3. Device 100 may include a bus 310, a processing unit 320, a main memory 330, a read only memory (ROM) 340, a storage device 350, an input device(s) 360, an output device(s) 370, and a communication interface(s) 380. Bus 310 may include a path that permits communication among the components of device 100.

Processing unit 320 may include one or more processors or microprocessors, or processing logic, which may interpret and execute instructions. Main memory 330 may include a random access memory (RAM) or another type of dynamic storage device that may store information and instructions for execution by processing unit 320. ROM 340 may include a ROM device or another type of static storage device that may store static information and instructions for use by processing unit 320. Storage device 350 may include a magnetic and/or optical recording medium. Main memory 330, ROM 340 and storage device 350 may each be referred to herein as a "tangible non-transitory computer-readable medium."

Input device 360 may include one or more mechanisms that permit user 260 to provide user input to device 100, such as, for example, a keypad or a keyboard, a display with a touch sensitive panel (i.e., a touch screen display), voice recognition and/or biometric mechanisms, etc. Input device 360 may include display unit 105 depicted in FIGS. 1A-1D. Output device 370 may include one or more mechanisms that output information to the operator, including a display (e.g., the touch screen display), a speaker, etc. Input device 360 and output device 370 may, in some implementations, be implemented as a user interface (UI) that displays UI information and which receives user input via the UI. Communication interface(s) 380 may include one or more transceivers that enable device 100 to communicate with other devices and/or systems. Communication interface(s) 380 may include wired or wireless transceivers for communicating via network 240. For example, communication interface(s) 380 may include a cellular network transceiver, a Wi-Fi transceiver, and/or a Bluetooth transceiver, etc.

The configuration of components of device 100 illustrated in FIG. 3 is for illustrative purposes. Other configurations may be implemented. Therefore, device 100 may include additional, fewer and/or different components, possibly arranged in a different configuration, than those depicted in FIG. 3.

Figure 4:
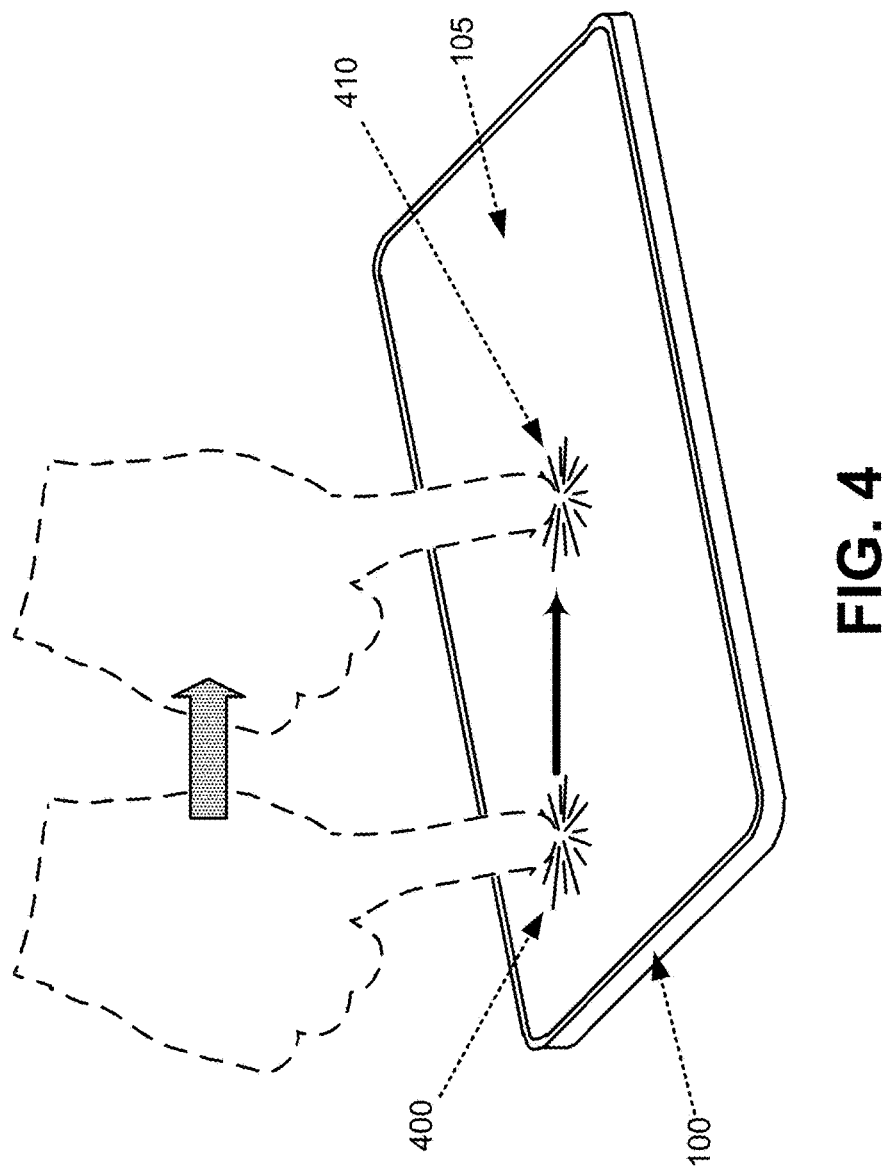
FIG. 4 depicts an exemplary implementation in which the display unit of the input device(s) of the device of FIG. 3 includes a touch screen display.

FIG. 4 depicts an exemplary implementation in which display unit 105 of input device(s) 360 of device 100 includes a touch screen display. The touch screen display may further include a touch panel that may be integrated with, and/or overlaid on, the display of the touch screen display to form a touch screen or a panel-enabled display that may function as a user input interface. For example, in one implementation, the touch panel may include a capacitive type of touch panel that allows a touch screen display to be used as an input device. The capacitive type of touch panel may include a self capacitance, a mutual capacitance, or both a self capacitance and a mutual capacitance type of touch panel. In other implementations, other types of near field-sensitive, acoustically-sensitive (e.g., surface acoustic wave), photo-sensitive (e.g., infrared), and/or any other type of touch panel may be used that allows a display to be used as an input device. In some implementations, the touch panel may include multiple touch-sensitive technologies. Generally, the touch panel may include any kind of technology that provides the ability to identify the occurrence of a touch or near touch, and a location and direction of touch movements or gestures, upon the touch panel.

The display (e.g., within the touch surface shown in FIG. 4) of display unit 105 associated with the touch panel may include a device that can display signals generated by device 100 as text or images on a screen (e.g., a liquid crystal display (LCD), a cathode ray tube (CRT) display, a light emitting diode (LED) display such as an organic light-emitting diode (OLED) display, a surface-conduction electro-emitter display (SED), a plasma display, a field emission display (FED), a bistable display, etc.). In certain implementations, the display may provide a high-resolution, active-matrix presentation suitable for the wide variety of applications and features associated with typical devices. The display may provide visual information to the user and serve—in conjunction with the touch panel—as a user interface to detect user input. The terms "touch," "touch input," or "swipe," as used herein, may refer to a touch of an object upon the touch panel, such as a body part (e.g., a finger) or a pointing device, or movement of an object (e.g., body part or pointing device) to within a certain proximity of the touch panel that can be sensed as a "touch" by the touch panel.

As shown in FIG. 4, the touch panel of display unit 105 may sense a touch, such as a "swipe" using user 260's fingertip. A "swipe," as referred to herein may include a continuous touch upon a touch surface of display unit 105 from a first position 400 to a second position 410, where the location of the swipe across display unit 105 can be determined via the touch panel of the display unit 105.

Figure 5:
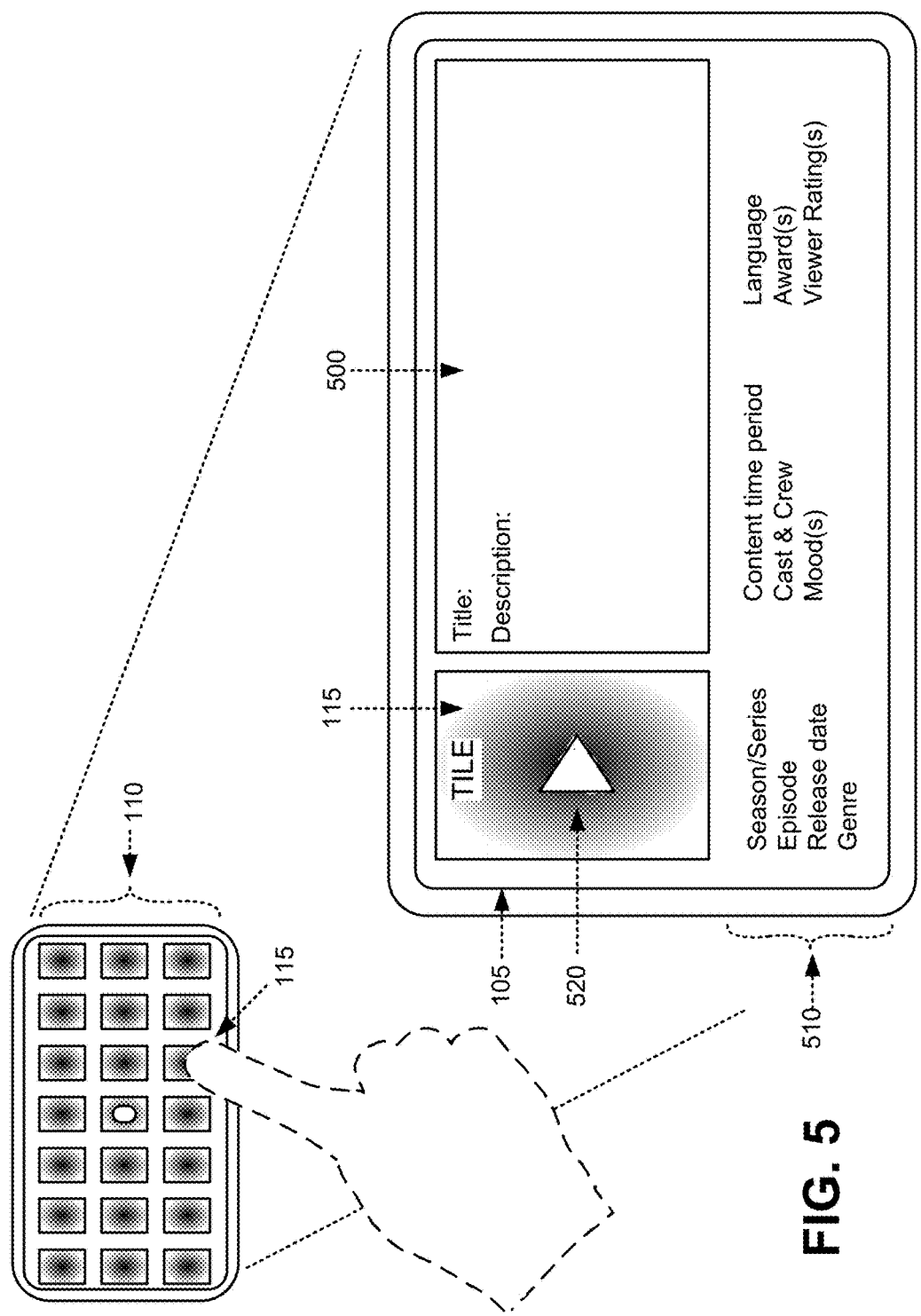
FIG. 5 depicts user selection of an item of content from the tile display of FIGS. 1C and 1D.

FIG. 5 depicts user selection of an item of content from tile display 110 of FIGS. 1C and 1D. Subsequent to navigating through content search results, user 260 may select (e.g., touch) a tile 115 of tile display 110 to view details of the content in preparation for possible playback (i.e., listening and/or viewing) of the content via a media player of device 100. As shown in FIG. 5, details of the content associated with the selected tile 115 may be displayed via display unit 105. For example, the details may include a larger version of tile 115, title and description properties 500, and other properties 510 of the content. The title may identify the title of the movie or program series and the description may include a textual description of the subject matter of the content. The other properties 510 may include, for example, a season/series identifier, an episode identifier (episode number and/or episode title), an original release date of the content, a genre(s) associated with the content, a time period associated with the subject matter of the content, a cast and crew associated with the content, a mood(s) associated with the subject matter of the content, a language used (spoken and/or written) within the content, award(s) given to the content, and viewer ratings applied to the content by other users. User 260, upon viewing the details of the selected content, may select a button 520 (e.g., a play button) that initiates delivery of the content from content source(s) 230 to device 100.

FIGS. 6A-18 depict various examples associated with navigating through search results or recommended content displayed via tile display 110, and examples associated with customizing tile display 110 (e.g., zooming in, zooming out, search parameter customization, etc.). FIGS. 6A-10 depict examples of user input for "zooming in" and "zooming out" upon tile display 110 according to an implementation in which display unit 105 is a touch screen display. FIG. 6A illustrates a two-finger "span out" user input that corresponds to "zooming in," and FIG. 6B illustrates a two-finger "pinch" user input that corresponds to "zooming out." The "zooming in" user input of FIG. 6A and the "zooming out" user input of FIG. 6B may be used to change a focus level associated with focus tile 130. Additionally, the "zooming in" user input of FIG. 6A and the "zooming out" user input of FIG. 6B may be used to change a search parameter associated with a dimension (e.g., dimensions 1-4 of FIG. 1A).

As shown in FIG. 6A, user 260 may apply two fingers to a touch surface of display unit 105 such that a first finger touches at a first location 605 and a second finger touches at a second location 610, and user 260 may then "span out" the two fingers in a linear direction relative to one another (i.e., both fingers "span out" along a line) to perform a "zoom in" operation. As additionally shown in FIG. 6B, user 260 may apply two fingers to a touch surface of display unit 105 such that a first finger touches at a first location 615 and a second finger touches at a second location 620, and user 260 may then "pinch" the two fingers towards one another along a linear dimension (i.e., both fingers "pinch" together along a line) to perform a "zoom out" operation.

Figure 7:
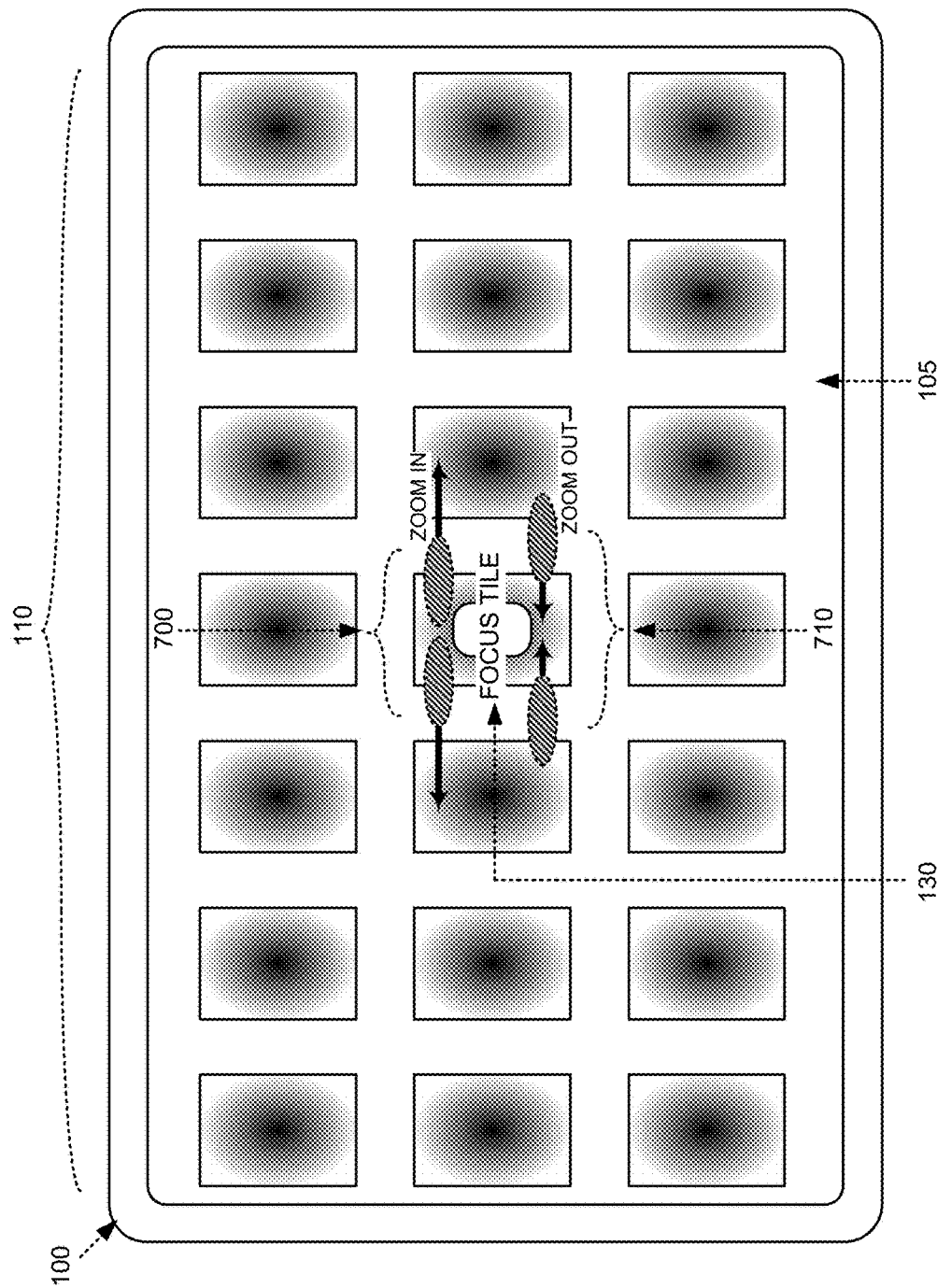
Figure 8:
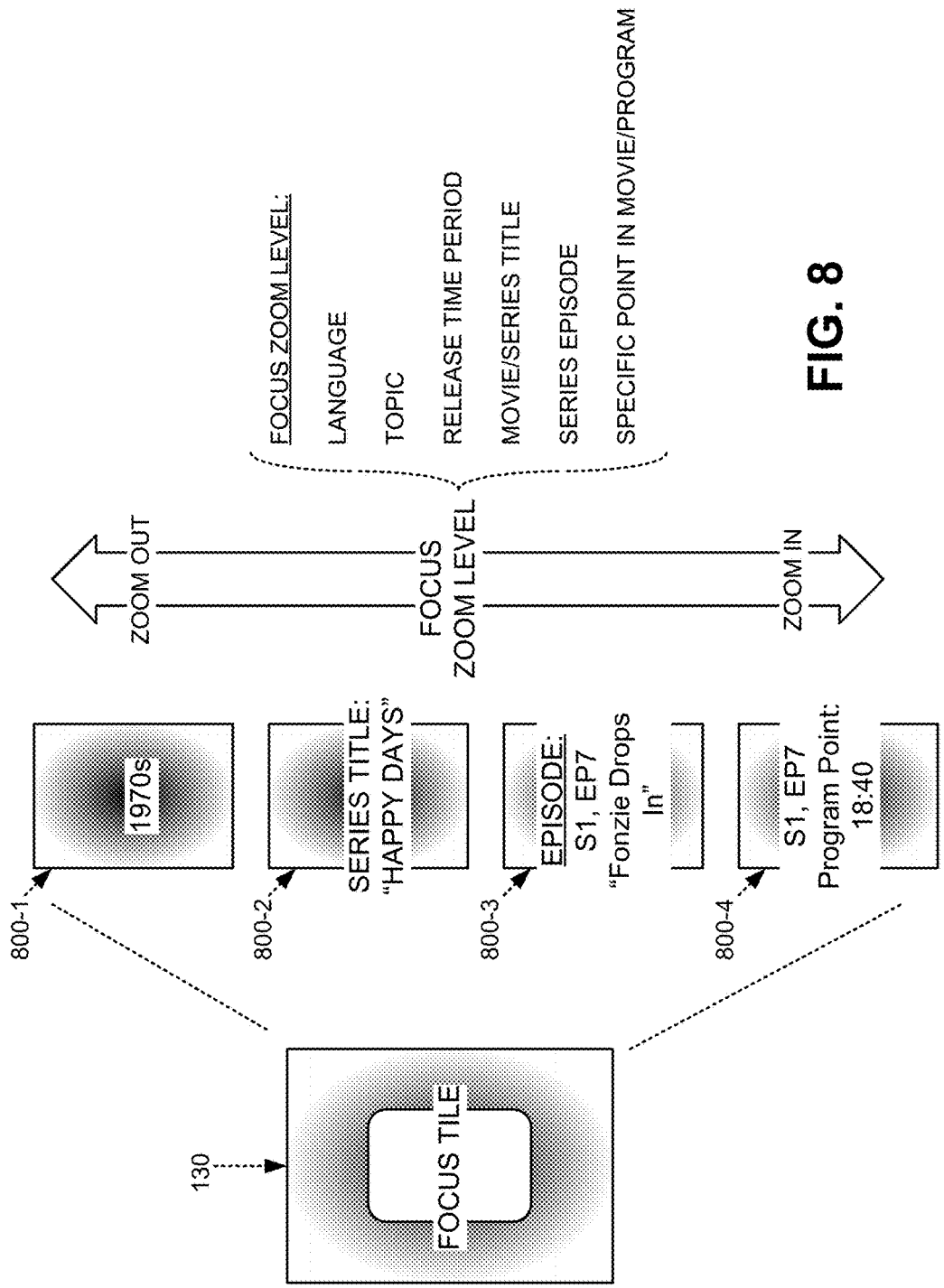

FIGS. 7-8 illustrate the user inputs of FIGS. 6A and 6B being used for changing a focus level associated with focus tile 130 of tile display 110. As shown, a "zoom in" user input 700, corresponding to the two-finger "span out" of FIG. 6A, may be performed near the location of center focus tile 130. As also shown, a "zoom out" user input 710, corresponding to the two-finger "pinch" of FIG. 6B, may be performed near the location of focus tile 130. FIG. 8 depicts a focus zoom level of focus tile 130 that is associated with the "zooming in" and "zooming out" the focus level via the user inputs shown in FIG. 7. The focus level associated with a focus tile 130 may include various different levels, including (in order from "zoomed out" to "zoomed in"), for example, language, topic, release time period, movie/series title, series episode, and a specific point in the movie/program. At each different focus level, the focus tile 130's icon or image may change and/or text associated with focus tile 130 may change to reflect the new zoom level of the content associated with focus tile 130. The content associated with focus tile 130 may include a group of items of content (e.g., television shows of the 1950s), or a single item of content (the movie "Casablanca").

FIG. 8 depicts an example of a focus zoom level associated with focus tile 130, where at a "zoomed out" level, focus tile 130 represents a group of items of content 800-1 originally released in the 1970s. At a next "zoomed in" level, focus tile 130 represents the specific program series 800-2 titled "Happy Days" which is from a group of program series originally released in the 1970s. At a further "zoomed in" level, focus tile 130 represents a specific episode (e.g., season 1, episode 7, episode titled "Fonzie Drops In") of the program series "Happy Days." At the deepest level of "zoomed in," focus tile 130 represents a specific point within the specific episode of "Happy Days" (e.g., program point 18:40 in season 1, episode 7 of "Happy Days"). As shown in FIG. 8, the focus zoom level may be moved upwards and downwards based on "zoom in" 700 and/or "zoom out" 710 user inputs depicted in FIG. 7. Changing the focus level changes the context of focus tile 130 for subsequent searches of relevant or recommended content.

Figure 9:
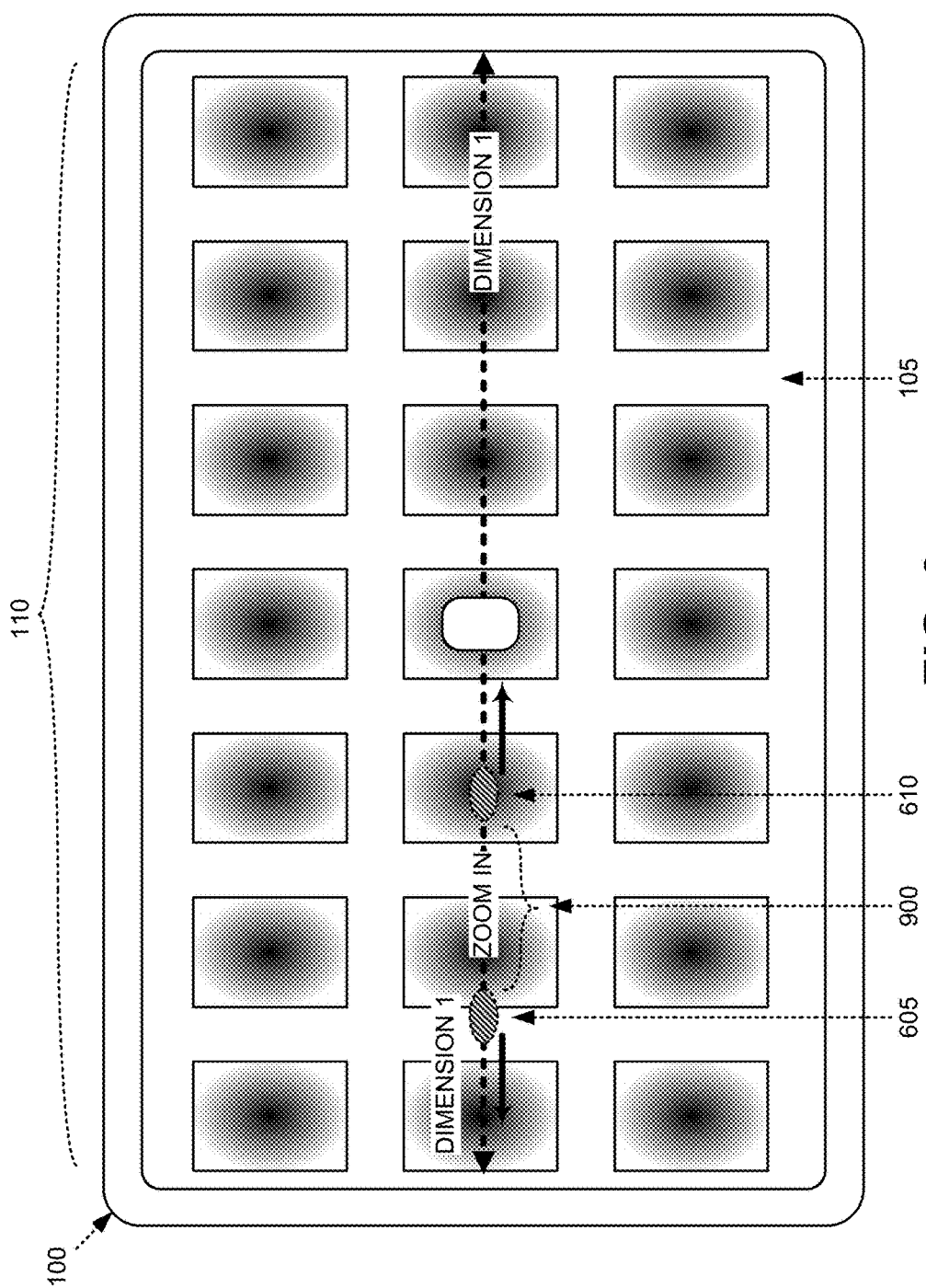

FIGS. 9 and 10 depict the changing of a search parameter associated with a dimension of tile display 110 by "zooming in" or "zooming out" of the dimension using the user inputs shown in FIGS. 6A and 6B. FIG. 9 depicts a "zoom in" user input 900 being applied to dimension 1 of tile display 110 where, similar to FIG. 6A, user 260 applies two fingers to a touch surface of display unit 105 such that a first finger touches at a first location 605 and a second finger touches at a second location 610, and user 260 then "spans out" the two fingers in a linear direction relative to one another (i.e., both fingers "span out" along a line) to perform a "zoom in" operation. In an example in which the search parameter of dimension 1 of tile display 110 is the original release date of the content, then "zooming in" may change the search parameter from a global date range (i.e., all dates) to a specific "focused" release date range, such as 1980-1989, 1980-85, 1981, or January-June 1981.

FIG. 10 depicts a "zoom out" user input 1000 being applied to dimension 2 of tile display 110 where, similar to FIG. 6B, user 260 applies two fingers to a touch surface of display unit 105 such that a first finger touches at a first location 615 and a second finger touches at a second location 620, and user 260 then "pinches" the two fingers towards one another along a vertical linear dimension (i.e., both fingers "pinch" together along a line) to perform a "zoom out" operation. In an example in which the search parameter of dimension 2 of tile display 110 content that is watchable now, either alphabetically ascending or descending, then "zooming out" may change the search parameter from content starting with a "W" to content starting with a letter in the range of "V-Z." Further "zooming out" may change the search parameter associated with dimension 2 from content starting with a letter in the range of "V-Z" to content starting with a letter in the range of "L-Z," or even additional "zooming out" to change the search parameter associated with dimension 2 from content starting with a letter in the entire alphabetic range ("A-Z").

Figure 11B:
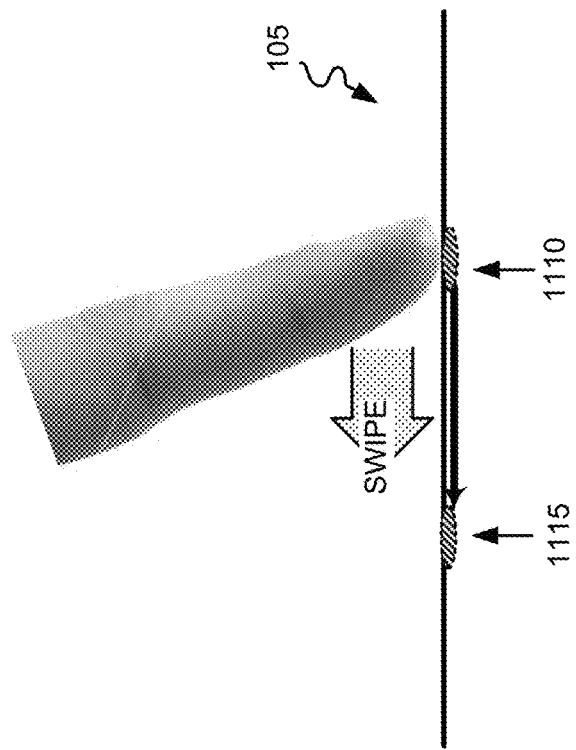
Figure 11A:
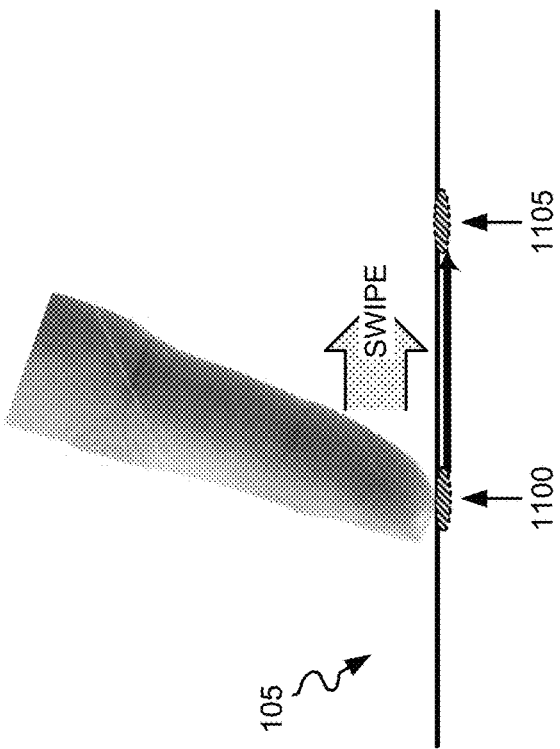

FIGS. 11A-11B depict examples of a "swipe" user input for selecting a search parameter corresponding to a search dimension in an implementation in which display unit 105 is a touch screen display. As shown in FIG. 11A, to perform a left-to-right directional swipe, user 260 may apply a single finger at a first touch location 1100 and move the finger in a left-to-right direction across a touch surface of display unit 105 of device 100 to stop at a swipe stop location 1105. As also shown in FIG. 11B, to perform a right-to-left directional swipe, user 260 may apply a single finger at a first touch location 1110 and move the finger in a right-to-left direction across the touch surface of display unit 105 of device 100 to stop at a swipe stop location 1115.

Figure 12:
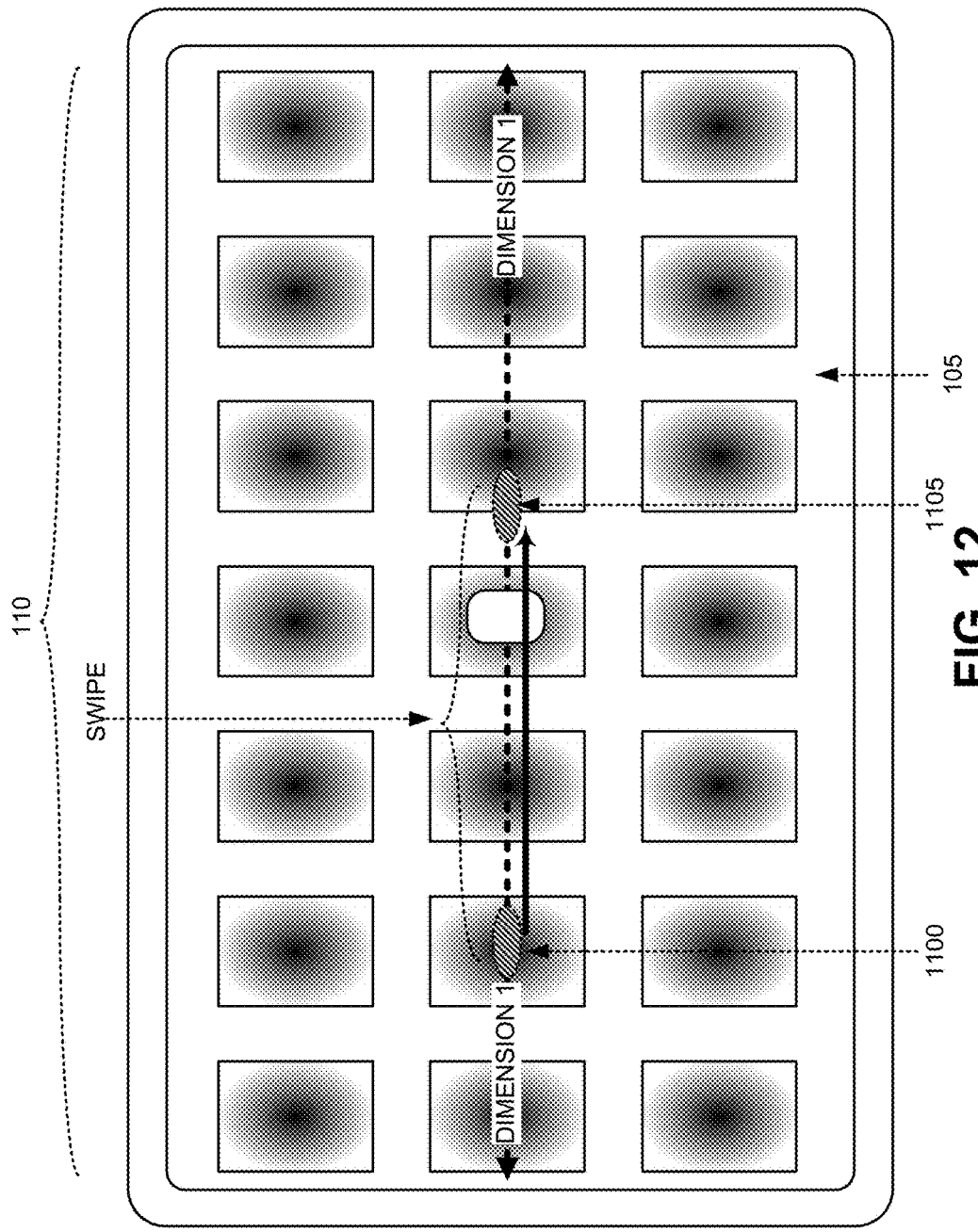
Figure 13:
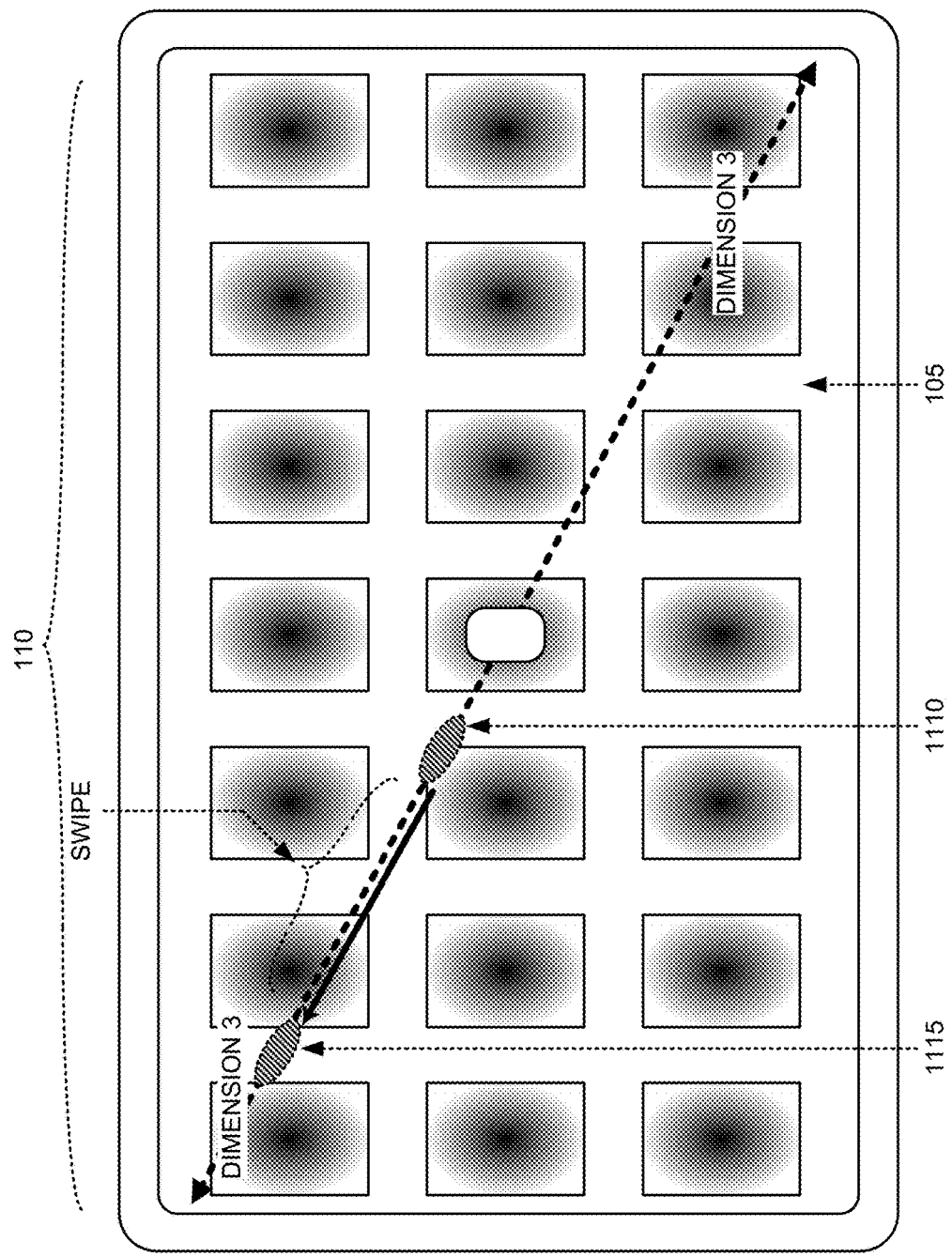

FIG. 12 illustrates an example of a "swipe" user input applied relative to tile display 110 displayed upon display unit 105 of device 100. As shown, a linear left-to-right swipe from first touch location 1100 to swipe stop location 1105 occurs upon dimension 1 of tile display 110, indicating a search of content based on a search parameter assigned to dimension 1. FIG. 13 illustrates another example of a "swipe" user input applied relative to tile display 110 displayed upon display unit 105 of device 100, where the "swipe" is a linear right-to-left diagonal upwards swipe from first touch location 1110 to swipe stop location 1115 upon dimension 3 of tile display 110. The directional swipe upon dimension 3, as depicted in FIG. 13, indicates a search of content based on a search parameter assigned to dimension 3. FIG. 14 illustrates a further example of a "swipe" user input applied relative to tile display 110 displayed upon display unit 105 of device 100, where the "swipe" is a linear right-to-left diagonal downwards swipe from first touch location 1110 to swipe stop location 1115 upon dimension 4 of tile display 110. The directional swipe upon dimension 4, as depicted in FIG. 14, indicates a search of content based on a search parameter assigned to dimension 4.

FIGS. 15A-15D depict examples of "hold and swipe" user inputs for performing a "panning" operation upon tile display 110 in an implementation in which display unit 105 is a touch screen display. Each of the user inputs of FIGS. 15A-15D differ in that different ones of two fingers are "holding" in place and/or performing a slow swipe across a touch surface of display unit 105 of device 100. As shown in FIG. 15A, a first "hold and swipe" user input 1500 includes a first finger (a thumb is shown) touching display unit 105 at a first location 1505 and holding in place (i.e., not moving) while a second finger (index finger shown), at a second location 1510 upon display unit 105 at a distance from first location 1505, engages in a slow swipe towards first location 1505. FIG. 15B depicts another "hold and swipe" user input 1515 that includes a first finger (a thumb is shown) touching display unit 105 at a first location 1520 and holding in place (i.e., not moving) while a second finger (index finger shown), at a second location 1525 upon display unit 105 at a distance from first location 1520, engages in a slow swipe away from first location 1520.

FIG. 15C depicts a further "hold and swipe" user input 1530 that includes a first finger (an index finger is shown) touching display unit 105 at a first location 1535 and holding in place (i.e., not moving) while a second finger (a thumb is shown), at a second location 1540 upon display unit 105 at a distance from first location 1535, engages in a slow swipe away from first location 1535. FIG. 15D depicts an additional "hold and swipe" user input 1545 that includes a first finger (an index finger is shown) touching display unit 105 at a first location 1550 and holding in place (i.e., not moving) while a second finger (a thumb is shown), at a second location 1555 upon display unit 105 at a distance from first location 1550, engages in a slow swipe towards first location 1550.

Figure 16B:
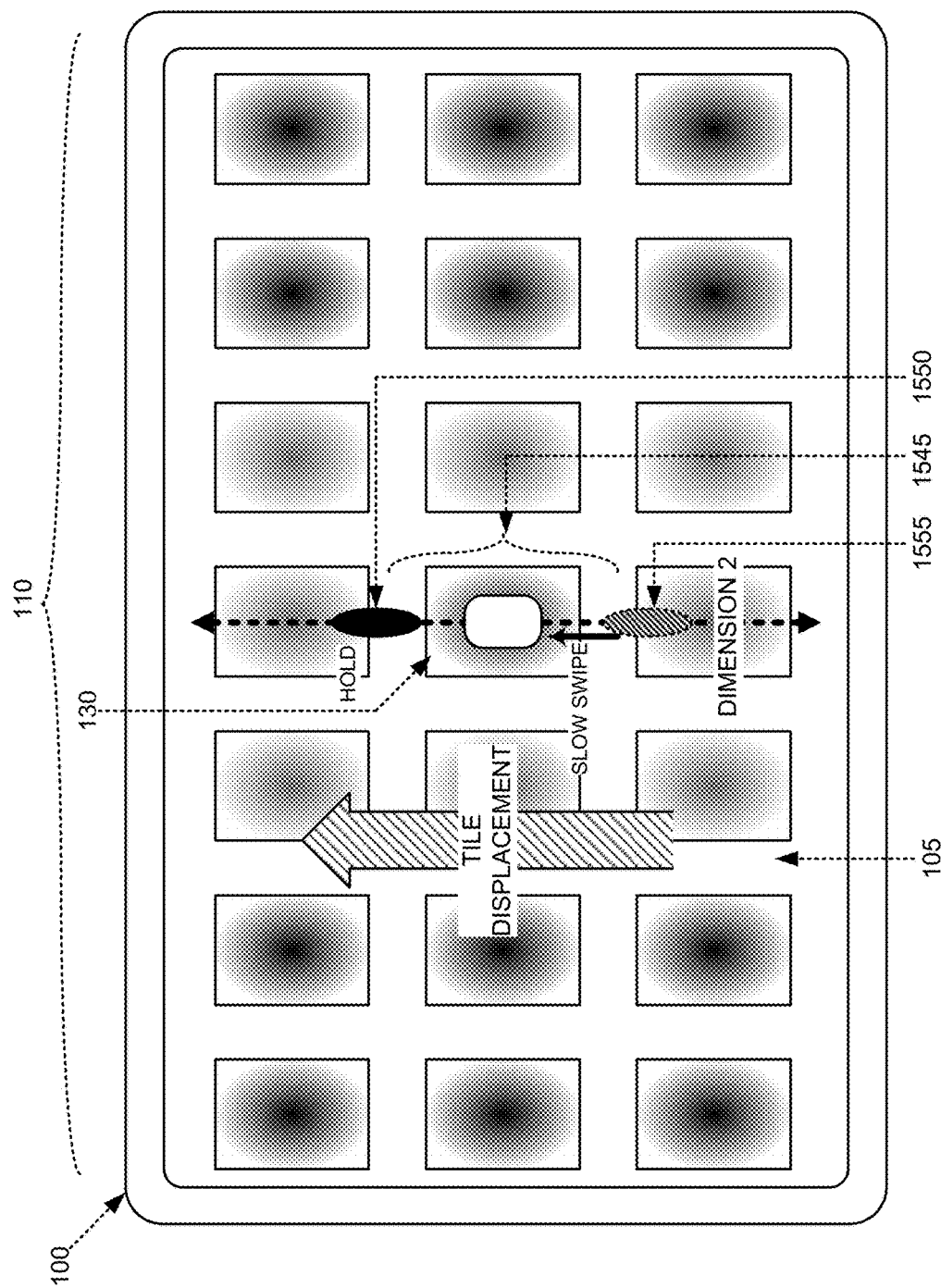

The different "hold and swipe" user inputs depicted in FIGS. 15A-15D may be used for performing a panning operation that brings a different tile of tile display 110 into focus as focus tile 130, such that navigation may then be based on the properties of the new focus tile 130. FIGS. 16A and 16B depicts two examples of the user of "hold and swipe" user inputs for performing a panning operation upon tile display 110. In the example of FIG. 16A, a "hold and swipe" user input 1500, which corresponds to that depicted in FIG. 15A, may be applied to the touch surface of display unit 105, where display unit 105 is a touch screen display. The "slow swipe" at location 1510, along dimension 1, towards location 1505 causes a right-to-left tile displacement along the tile row corresponding to dimension 1. Therefore, the tile or tiles to the right of focus tile 130, as the "hold and swipe" user input 1500 is applied to display unit 105, are displaced leftwards to become the focus tile 130. The size of the "hold and swipe," or the number of small "hold and swipes," that are performed determines which tile to the right of the original focus tile 130 is displaced into position as the new focus tile 130. Tile displacement via the "hold and swipe" user input 1500 along dimension 1, as shown in FIG. 16A, therefore causes a leftwards tile by tile displacement depending on the size of the "hold and swipe" or depending on the number of "hold and swipes" performed.

In the example of FIG. 16B, a "hold and swipe" user input 1545, which corresponds to that depicted in FIG. 15D, may be applied to the touch surface of display unit 105, where display unit 105 is a touch screen display. The "slow swipe" at location 1555, along dimension 2, towards location 1550 causes an upwards (i.e., bottom to top of display unit 105) tile displacement along the tile column corresponding to dimension 2. Therefore, the tile or tiles below focus tile 130 in the same column of tile display 110, as the "hold and swipe" user input 1500 is applied to display unit 105, are displaced upwards to become the focus tile 130. The size of the "hold and swipe," or the number of small "hold and swipes" that are performed determines which tile beneath the original focus tile 130 is displaced into position as the new focus tile 130. Tile displacement via the "hold and swipe" user input 1500 along dimension 2, as shown in FIG. 16B, therefore causes an upwards tile by tile displacement along a column corresponding to dimension 2 that depends on the size of the "hold and swipe" or depends on the number of "hold and swipes" performed.

Figure 17:
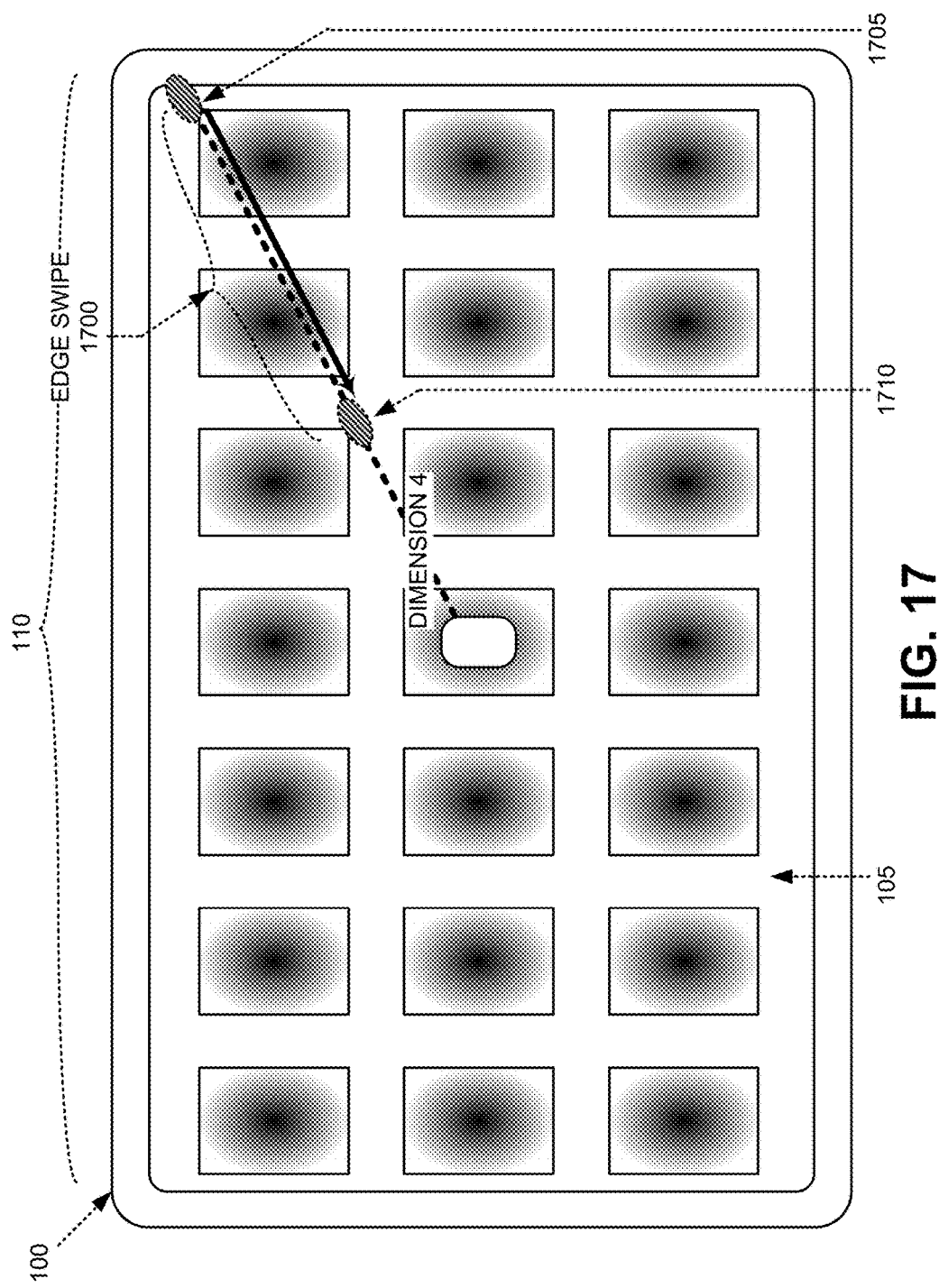
FIGS. 17 and 18 depict examples associated with manually re-assigning a search parameter to a particular selected dimension of the tile display of FIG. 1A.
Figure 18:
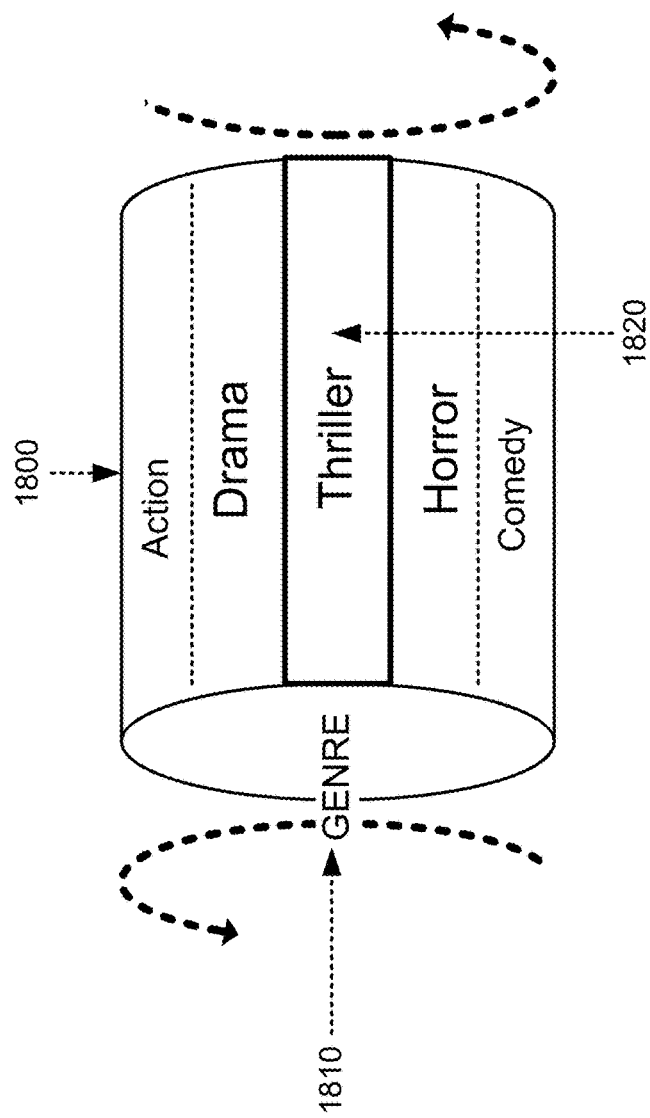

FIGS. 17 and 18 depict examples associated with manually re-assigning a search parameter to a particular selected dimension of tile display 110. The particular dimension/search parameters assignments, such as, for example, those depicted in FIG. 1B, may be changed based on user input.

In the example of FIG. 17, where display unit 105 includes a touch screen display, an "edge swipe" or "edge pull" user touch input may be applied to tile display 110 on display unit 105 to re-configure a particular dimension of tile display 110. The "edge swipe" or "edge pull" includes a touch that starts along an outer edge of display unit 105 and moves inwards along the particular dimension whose search parameter is being re-assigned. For example, as shown in FIG. 17, an edge swipe 1700 may start at an upper right corner of display unit 105, at a first edge location 1705, and the touch input may move inwards along dimension 4 to stop at a second location 1710. Movement of edge swipe 1700 along dimension 4 selects that dimension for search parameter re-assignment. Search parameter re-assignment, upon receipt of edge swipe 1700, may include the presentation of a carousel or dial, through which user 260 selects a new search parameter to be assigned to the selected dimension (e.g., dimension 4 in this example).

FIG. 18 depicts a carousel 1800 that, at the occurrence of edge swipe 1700, is presented via display unit 105. Carousel 1800 may display a range of different values that are associated with a particular search parameter 1810. In the example of FIG. 18, the search parameter 1810 is "genre" and carousel 1800 displays various different types of genres (e.g., action, drama, thriller, horror, comedy, etc.) that may be selected. User input (e.g., touch swipes) may move carousel 1800 in a clockwise or counter clockwise direction to bring a particular type of genre into the highlighted position, at which a single touch may select the particular type of genre located in the highlighted position. FIG. 18 depicts manually changing a value of the particular search parameter associated with a dimension of tile display 110. In other implementations, carousel 1800, as a response to edge swipe 1700 or a different user input, may enable user 260 to entirely re-assign the particular search parameter assigned to the selected dimension. For example, instead of dimension 4 being assigned "content-based similarity—genre," as depicted in the example of FIG. 1B, dimension 4 may be re-assigned with "user ratings" where a search based on the selection of dimension 4 is performed to show search results from a high to low user rating.

Figure 19:
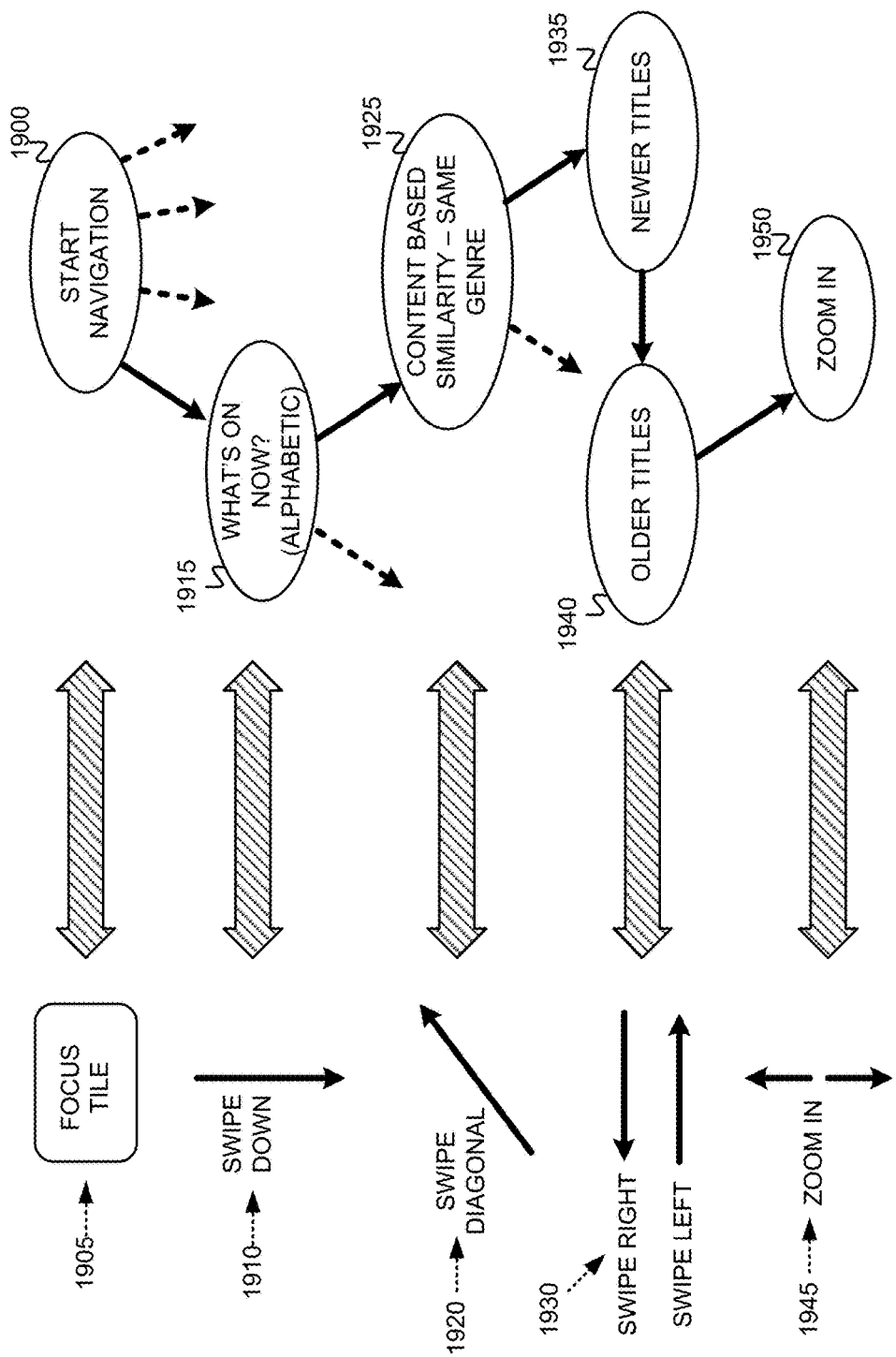
FIG. 19 depicts an illustrative example of navigation using the tile display of FIG. 1B.

FIG. 19 depicts an illustrative example of navigation using tile display 110 shown in FIG. 1B. As shown, navigation 1900 may start with a particular focus tile 1905 displayed via tile display 110. User 260 (not shown) may perform a downwards swipe (i.e., "swipe down") 1910 upon tile display 110 to select dimension 2 of tile display 110 that corresponds to the "watchable now, alphabetic ascending" search parameter. Tile display 110 (not shown) is then re-populated with content that is watchable now, with the content being listed, tile-by-tile, in alphabetically ascending order upon tile display 110. Subsequently, user 260 may perform an upwards diagonal swipe 1920 upon tile display 110 to select dimension 4 of display 110 that corresponds to the "content-based similarity—same genre" search parameter 1925. A search of content catalog DB 210 is performed to identify content having a same genre as the genre of the content in focus tile 130. Tile display 110 is then re-populated with content that results from the search of content catalog DB 210. User 260 may perform a rightwards (i.e., "swipe right") or leftwards (i.e., "swipe left") swipe 1930 to view older titles 1940 or newer titles 1935 upon tile display 110. User 260 may then perform a "span out" gesture, such as that described with respect to FIG. 6A, to zoom in 1950 the focus level of the current tile serving as focus tile 130.

Figure 20:
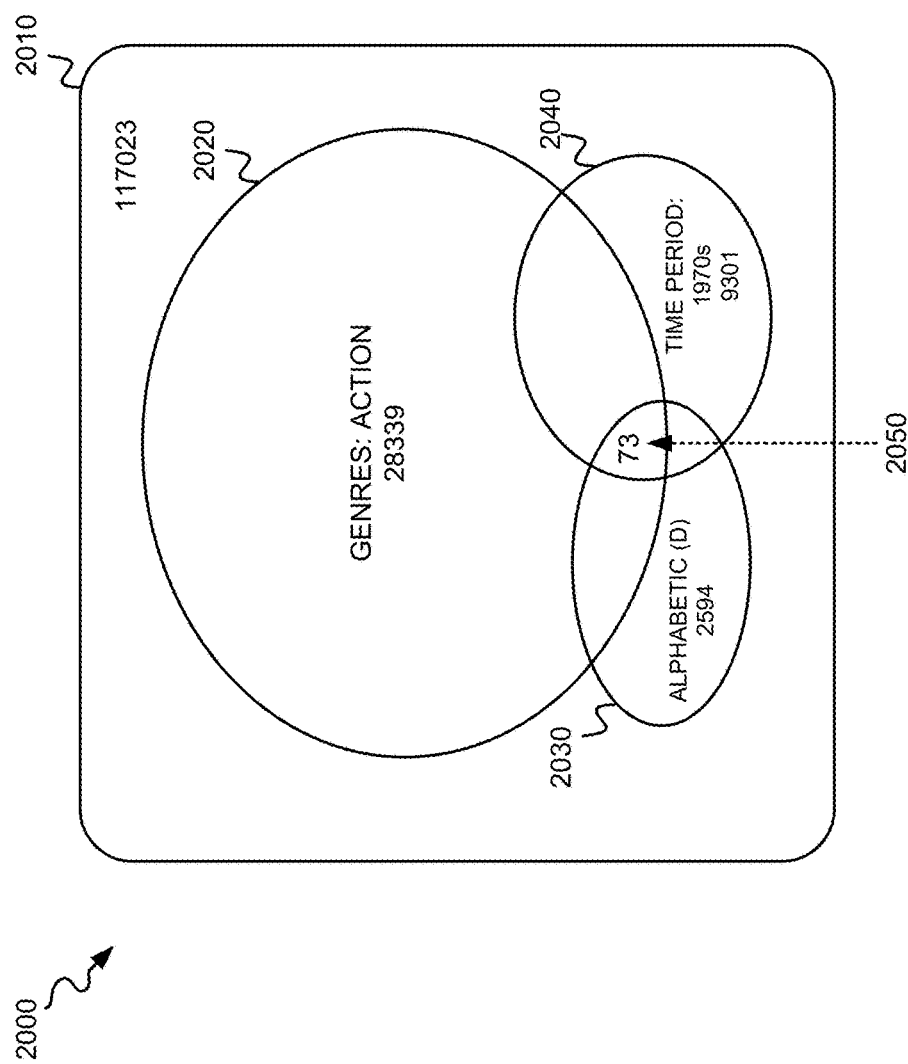
FIG. 20 depicts a visual diagram that represents a visualization of the size of the results space currently displayed via the tile display of FIG. 1B.

In one implementation, a visual diagram 2000, shown in FIG. 20 and representing a visualization of the size of the results space currently displayed via tile display 110, may be displayed via display unit 105 based on user input. Visual diagram 2000 may, for example, include a Venn diagram representation of the search results space. In the example visual diagram 2000 of FIG. 20, the overall search results space includes 117,023 items of content, with 28,339 items of content of those 117,023 items including content having a genre of "action" 2020, with 2,594 items of content of those 11,023 items being watchable now and having a title started with a "D" 2030, and with 9,301 items of content of those 117,023 items including content being associated with the 1970s time period 2040. As further shown in visual diagram 2000, the intersection of the genre "action" results 2020, the alphabetic "D" results 2030, and the 1970s time period results 2040 includes results 2050 having 73 items of content. The 73 items of content in the intersection set 2050 comprise search results having a genre of "action," a time period of the 1970s, and a title starting with a "D." Though a Venn diagram representation of the search results space is shown in FIG. 20, other types of visual representations may be used including, for example, a tree structure, or a subgraph in a graph. Visual diagram 2000, therefore, when selected by user 260, provides user 260 with an indication of how user 260's navigational activity has restricted the search space such that they can move forward or backwards in the search level to decrease or increase the number of search results.

Figure 21:
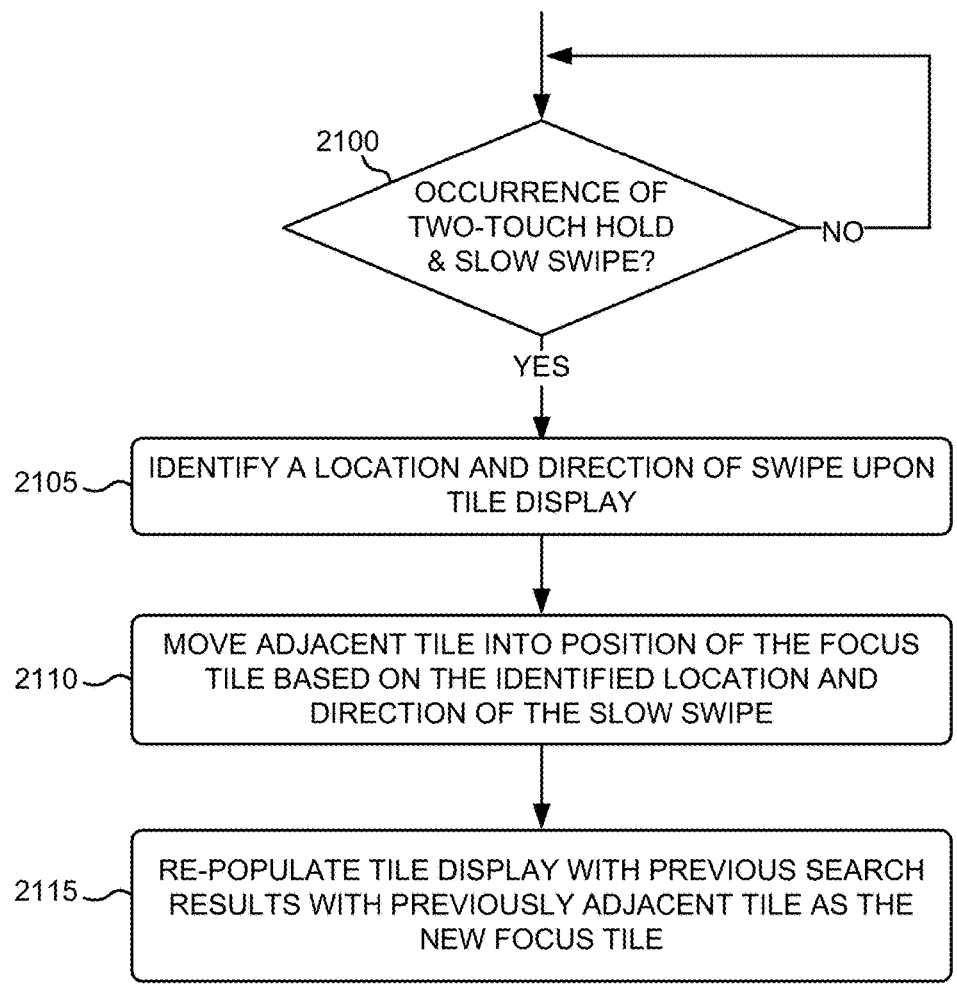
FIGS. 21-24 are flow diagrams of exemplary processes, or portions of processes, for performing a search of the content catalog database of FIG. 2 based on the occurrence of user input at the device of FIG. 1A.

FIG. 21 is a flow diagram of an exemplary process, or portion of a process, for causing tile displacement, upon tile display 110, to move a different tile into position as the focus tile 130 based on the occurrence of a two-touch "hold and swipe" user input upon display unit 105. The exemplary process of FIG. 21 may be implemented by content catalog navigator 250 of device 100, possibly in conjunction with content catalog DB 210, content catalog device 220 and/or content source(s) 230. The exemplary process of FIG. 21 may be executed as a portion of another larger process, and/or in parallel with the execution of other processes, such as those associated with FIGS. 22-24 below.

The exemplary process may include device 100 determining if a two-touch "hold and slow swipe," such as shown in FIGS. 15A-15D, 16A and 16B, has occurred upon display unit 105 (block 2100). The touch screen display of display unit 105 may receive user input, including a single touch or two-touch user input, and device 100 (e.g., processing unit 320) may analyze the user touch input to determine if the user touch input is a two-touch "hold and swipe" input similar to that depicted in FIGS. 15A-15D, 16A and 16B.

Device 100 identifies a location and direction of the swipe upon tile display 110 (block 2105), moves an adjacent tile 115 into a position of focus tile 130 based on the identified location and direction of the slow swipe (block 2110), and re-populates tile display 110 with the previous search results with the previously adjacent tile 115 as the new focus tile 130 (block 2115). Content catalog navigator 250, executing on device 100, may identify the location of the swipe as being along dimension 1, dimension 2, dimension 3 or dimension 4 of tile display 110, and whether the "slow swipe" of the two-finger touch input is in a horizontal left-to-right direction or a horizontal right-to-left direction along dimension 1, a diagonal left-to-right direction or a diagonal right-to-left direction along dimensions 3 or 4, or a vertical upwards direction or a vertical downwards direction along dimension 2. Content catalog navigator 250, executing on device 100, causes the tiles of tile display 110 to displace in position in a direction that corresponds to the direction of the swipe of the "hold and swipe" user input upon tile display 110. Thus, for example, a horizontal left-to-right swipe associated with a "hold and swipe" user input causes the tiles of tile display 110 to move in a left-to-right direction causing one of the tiles adjacent to a focus tile 130 to move into position as the new focus tile 130 in tile display 110. Movement of the tiles of tile display in a direction corresponding to the swipe of the "hold and swipe" user input, when the tiles are re-populated after tile displacement, may, in certain instances, cause one or more tiles to be "shifted" off of tile display 110, such that the "shifted" tiles still reside in the set of search results but just are no longer displayed within the search results displayed via tile display 110 on display unit 105.

Figure 22:
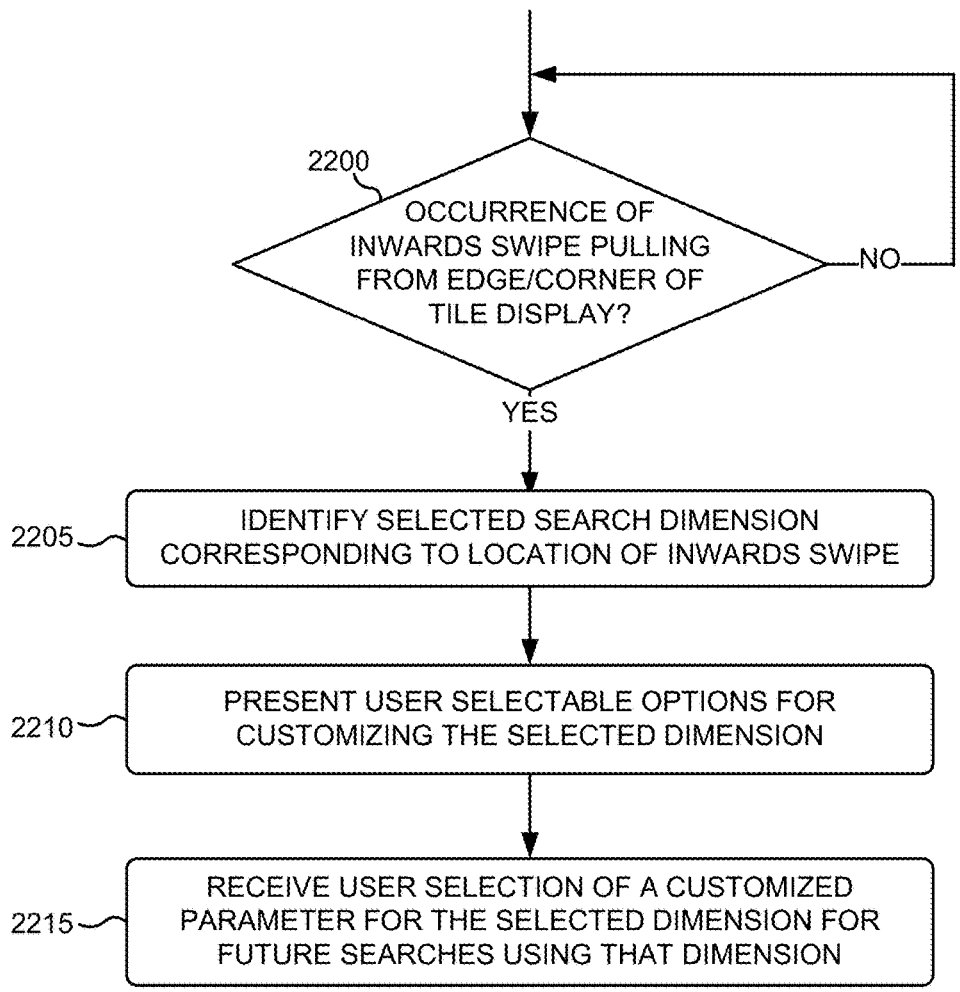

FIG. 22 is a flow diagram of an exemplary process, or portion of a process, for customizing a dimension associated with tile display 110 based on the occurrence of an inwards swipe from an edge or corner of display unit 105. The exemplary process of FIG. 22 may be implemented by content catalog navigator 250 of device 100, possibly in conjunction with content catalog DB 210, content catalog device 220 and/or content source(s) 230. The exemplary process of FIG. 22 may be executed as a portion of another larger process, and/or in parallel with the execution of other processes, such as those associated with FIGS. 21, 23 and/or 24.

The exemplary process may include device 100 determining if an inwards edge swipe, pulling from an edge or corner of tile display 110, has occurred (block 2200) and identifying a dimension of tile display 110 that corresponds to the location of the inwards edge swipe (block 2205). The edge swipe may occur as shown in, or similar to, the example of FIG. 17. Content catalog navigator 250, executing on device 100, may identify the location of the swipe as being at an edge of display unit 105 and directed inwards along a right or left side of dimension 1, dimension 3 or dimension 4; or directed inwards along either a top or bottom of dimension 2.

Device 100 presents user selectable options for customizing the selected dimension (block 2210) and receives user selection of a customized parameter for the selected dimension for future searches using that dimension (block 2215). In one implementation, as depicted in FIG. 18, content catalog navigator 250, executing on device 100, may present a carousel through which user 260 selects a new search parameter to be assigned to the selected dimension. As shown in the example of FIG. 18, the carousel 1800 can be presented via display unit 105 (in place of tile display 110) at the occurrence of edge swipe 1700. Carousel 1800 may display a range of different values associated with a particular search parameter 1810. As shown in the example of FIG. 18, the search parameter 1810 is "genre" and carousel 1800 displays various different types of genres (e.g., action, drama, thriller, horror, comedy, etc.) that may be selected. User input (e.g., touch swipes) may move carousel 1800 in a clockwise or counter clockwise direction to bring a particular type of genre into the highlighted position, at which a single touch may select the particular type of genre located in the highlighted position. FIG. 18 depicts manually changing a value of the particular search parameter associated with a dimension of tile display 110. In other implementations, carousel 1800, as a response to edge swipe 1700 or a different user input, may enable user 260 to entirely re-assign the particular search parameter assigned to the selected dimension. For example, instead of dimension 4 being assigned "content-based similarity—genre," as depicted in the example of FIG. 1B, dimension 4 may be re-assigned with "user ratings" where a search based on the selection of dimension 4 is performed to show search results from a high to low user rating.

Figure 23:
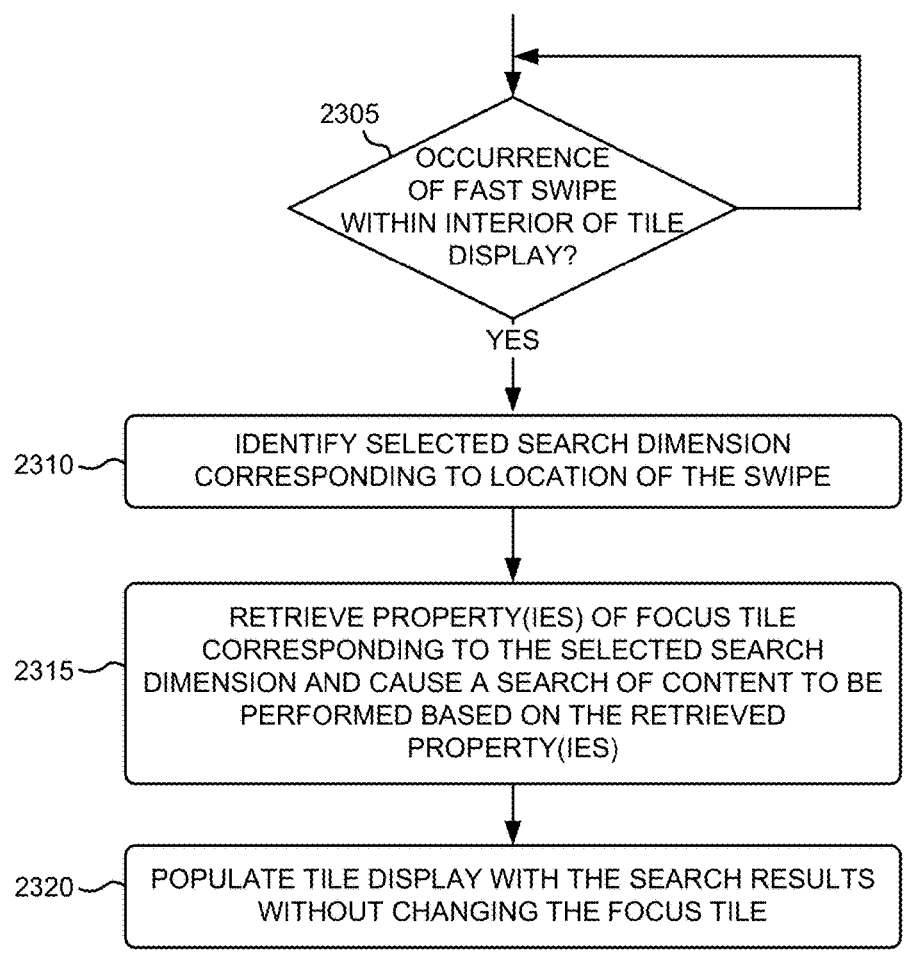

FIG. 23 is a flow diagram of an exemplary process, or portion of a process, for causing a search of content catalog DB 210 to be performed based on the occurrence of a "fast swipe" within an interior of tile display 110 displayed via display unit 105. The exemplary process of FIG. 23 may be implemented by content catalog navigator 250 of device 100, in conjunction with content catalog DB 210, content catalog device 220 and/or content source(s) 230. The exemplary process of FIG. 23 may be executed as a portion of another larger process, and/or in parallel with the execution of other processes, such as those associated with FIGS. 21, 22 and 24.

The exemplary process may include device 100 determining if a fast swipe, such as shown in FIGS. 11A, 11B, and 12-14, has occurred upon display unit 105 (block 2305), and identifying a selected search dimension corresponding to the location of the swipe (block 2310). Content catalog navigator 250, executing on device 100, may identify the location of a single touch "fast swipe" within the interior of tile display 110 as being along dimension 1, dimension 2, dimension 3 or dimension 4 of tile display 110, and whether the "fast swipe" of the single touch user input is in a horizontal left-to-right direction or a horizontal right-to-left direction along dimension 1, a diagonal left-to-right direction or a diagonal right-to-left direction along dimensions 3 or 4, or a vertical upwards direction or a vertical downwards direction along dimension 2. Based on search parameters currently assigned to the different dimensions, such as shown in the example of FIG. 1B, content catalog navigator 250 identifies the specific search parameter current assigned to the identified location and direction of the "fast swipe." For example, referring to the example tile display 110 of FIG. 1B, a diagonal left-to-right single touch fast swipe along dimension 3 causes content catalog navigator 250 to identify "cast/crew-based similarity" as being the search dimension for searching content catalog DB 210.

Device 100 retrieves a property (or properties) of focus tile 130 of tile display 110 that corresponds to the selected search dimension, and causes a search of content to be performed based on the retrieved property (or properties) (block 2315). For example, referring again to the example tile display 110 of FIG. 1B, the diagonal left-to-right single touch fast swipe along dimension 3 causes content catalog navigator 250 to retrieve the "cast and crew" properties associated with focus tile 130, and causes a search of content catalog DB 210 to be performed to find content that has a same cast and crew as the retrieved "cast and crew" properties associated with focus tile 130. Content catalog navigator 250 of device 100 populates tile display 110 with the search results, without changing focus tile 130 (block 2320). Leaving the current focus tile 130 in place in tile display 110, content catalog navigator 250 populates tile display 110 with the tiles corresponding to the search results obtained from searching content catalog DB 210 with the properties of the selected search dimension associated with the current focus tile 130.

Figure 24:
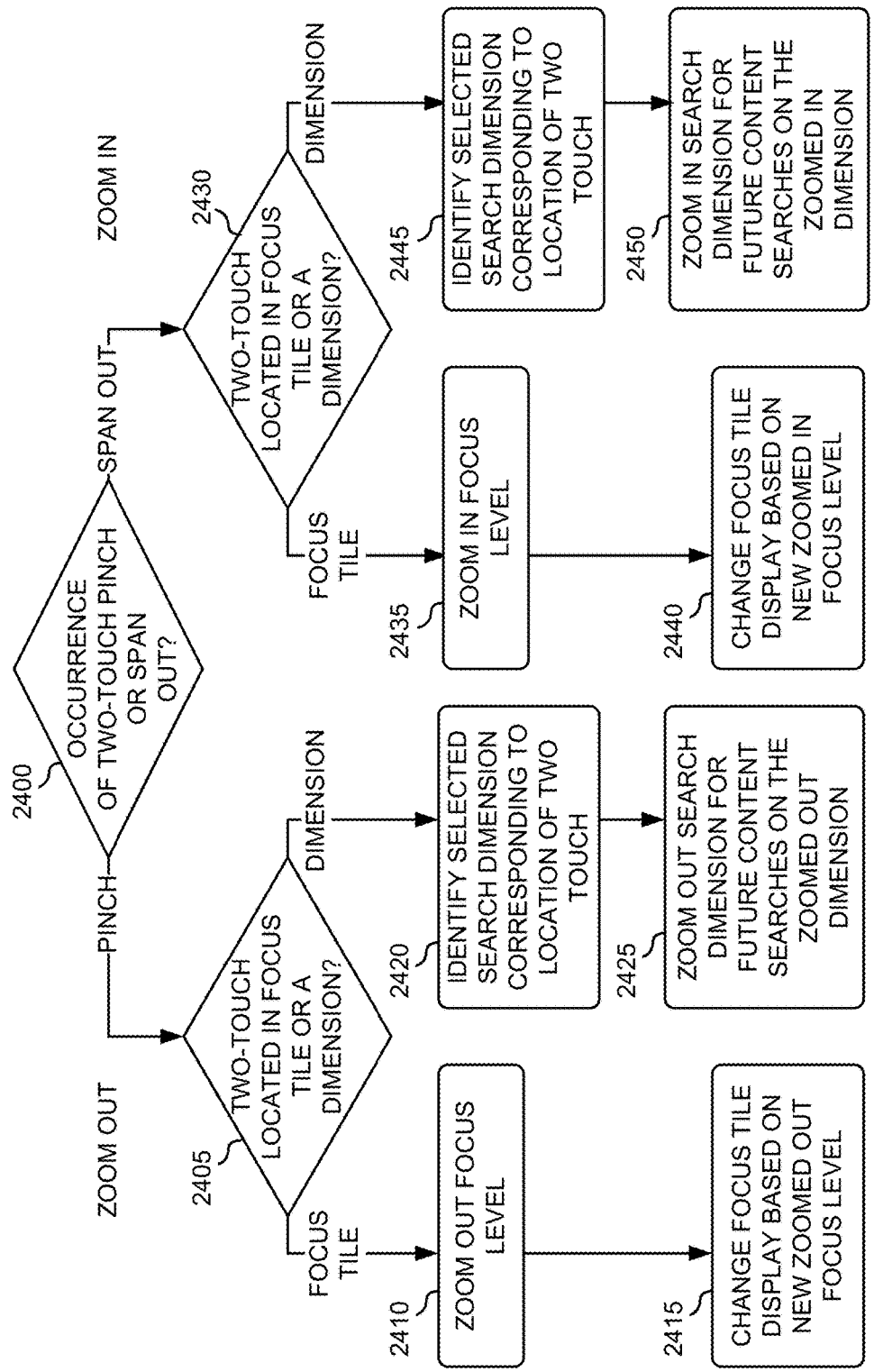

FIG. 24 is a flow diagram of an exemplary process, or portion of a process, for "zooming in" or "zooming out" within focus tile 130 or a dimension (e.g., dimension 1, 2, 3 or 4) of tile display 110 based on the occurrence of a "pinch" or "span out" user input via display unit 105. The exemplary process of FIG. 24 may be implemented by content catalog navigator 250 of device 100, possibly in conjunction with content catalog DB 210, content catalog device 220 and/or content source(s) 230. The exemplary process of FIG. 24 may be executed as a portion of another larger process, and/or in parallel with the execution of other processes, such as those associated with FIGS. 21-23.

The exemplary process may include device 100 determining if two-touch "pinch" or "span out" has occurred upon display unit 105 (block 2400). The two-touch "pinch" or "span out" may include two-touch user input received via a touch screen display of display unit 105, such as shown in FIGS. 6A ("span out") and 6B ("pinch").

If a two-touch "pinch" has occurred, indicating a "zoom out" operation, device 100 determines if the two-touch user input is located in focus tile 130 or along one of the dimensions of tile display 110 (block 2405). FIG. 7 depicts examples of a "pinch" user input 710 applied to focus tile 130 of tile display 110 for "zooming out" focus tile 130. FIG. 10 further depicts an example of a "pinch" user input applied to a dimension (e.g., dimension 2) of tile display 110 to "zoom out" on the dimension.

If the two-touch "pinch" is located in focus tile 130, then device 100 "zooms out" the focus level (block 2410) and changes the focus tile 130 display in tile display 110 based on the new "zoomed out" focus level (block 2415). Content catalog navigator 250 may cause focus tile 130 on tile display 110 to "zoom out" as depicted in the upwards direction of the example of FIG. 8, such as from a tile associated with a specific episode of a series to a tile associated with a time period when the series was originally aired on television.

Returning to block 2405, if the two-touch "pinch" is located along one of the dimensions of tile display 110 (e.g., dimension 1, dimension 2, dimension 3 or dimension 4), then device 100 identifies the selected search dimension corresponding to the location of the two-touch "pinch" (block 2420), and "zooms out" the search dimension for future content searches on the "zoomed out" dimension (block 2425). In an example in which the selected search parameter of dimension 2 of tile display 110 is "content, watchable now-alphabetically ascending," then "zooming out" upon dimension 2 may change the search parameter from content starting with a "W" to content starting with a letter in the range of "V-Z." Further "zooming out" may change the search parameter associated with dimension 2 from content starting with a letter in the range of "V-Z" to content starting with a letter in the range of "L-Z," or even additional "zooming out" to change the search parameter associated with dimension 2 from content starting with a letter in the entire alphabetic range ("A-Z").

Returning to block 2400, if a two-touch "span out" has occurred, indicating a "zoom in" operation, device 100 determines if the two-touch user input is located in focus tile 130 or along one of the dimensions of tile display 110 (block 2430). FIG. 7 depicts examples of a "span out" user input 700 applied to focus tile 130 of tile display 110 for "zooming in" focus tile 130. FIG. 9 further depicts an example of a "span out" user input applied to a dimension (e.g., dimension 1) of tile display 110 to "zoom out" on the dimension.

If the two-touch "span out" is located in focus tile 130, then device 100 "zooms in" the focus level such as described with respect to FIGS. 6B, 7 and 8 (block 2435), and changes the focus tile 130 display in tile display 110 based on the new "zoomed in" focus level (block 2440). Content catalog navigator 250 may cause focus tile 130 on tile display 110 to "zoom in" as depicted in the downwards direction of the example of FIG. 8, such as from a tile associated with a time period when a program series was originally aired on television, to a specific program point in a specific episode of the same program series.

Returning to block 2430, if the two-touch "span out" is located along one of the dimensions of tile display 110 (e.g., dimension 1, dimension 2, dimension 3 or dimension 4), then device 100 identifies the selected search dimension corresponding to the location of the two-touch "span out" (block 2445), and "zooms in" the search dimension for future content searches on the "zoomed in" dimension (block 2450). In an example in which the selected search parameter of dimension 2 of tile display 110 is "content, watchable now-alphabetically ascending," then "zooming in" upon dimension 2 may change the search parameter from content having a title starting with letter in the entire alphabetic range ("A-Z") to content with the title starting with a letter in the alphabetic range of "V-Z." Further "zooming in" may change the search parameter associated with dimension 2 from content having a title starting with a letter in the range of "V-Z" to content having a title with a letter in starting with a "W."

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with respect to FIGS. 21-24, the order of the blocks may be varied in other implementations. Moreover, non-dependent blocks may be performed in parallel. Implementations have been described herein as using touch input upon a touch screen display of display unit 105 for navigating tile display 110. In other implementations, other types of user interfaces (UIs) may be used instead of a touch screen display such as, for example, a joystick, a touchpad, or a key-based UI (e.g., arrow keys and/or diagonal keys for selecting one of the dimensions). Certain types of user input gestures (e.g., single touch fast swipe, two-touch pinch, two-touch span out, etc.) have been described herein for navigating content tiles displayed on tile display 110. Other types of user input gestures may be used in place of the ones described herein for navigating tile display 110. For example, different user input gestures, such as a multi-touch gesture, can be used to move up in the hierarchy, or to delete a particular dimension or search parameter from influencing a search of content. Implementations have been described herein as providing content recommendations to a user, based on user interaction with tile display 110, where the content may include any type of digital media, such as, for example, image media, audio only media, video only media, or audio and video combined media. In other implementations, the "content" stored at content source(s) 230 and content catalog DB 210 may be non-audio or non-video content. For example, the "content" may be books, apparel or other on-line merchandise, where the implementations described herein provide recommendations of such books, apparel or other on-line merchandise to the user via the user's interaction with tile display 110.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such.

Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
    displaying a tile display comprising a grid comprising multiple rows and columns of tiles upon a display unit of a device,
    wherein each of the tiles represents an item of content or a group of items of content;
    associating multiple different linear axes with the tile display, wherein the multiple different linear axes intersect at a center tile of the tile display, wherein the multiple different linear axes include a horizontal axis, a vertical axis, and diagonal axes,
    wherein multiple different properties are associated with the center tile, and wherein each linear axis is associated with two search parameters;
    receiving first user input associated with selecting one of the multiple different linear axes of the tile display,
    wherein the first user input includes a swipe in a first direction or a second direction along the one of the multiple different linear axes of the tile display,
    wherein the swipe in the first direction or the second direction includes a swipe of a first finger from a first location of the tile display to a second location of the tile display in the first direction or the second direction;
    identifying a first search parameter, for searching a content catalog, based on the selected one of the multiple different linear axes of the tile display, based on whether the swipe is in the first direction or the second direction, and based on at least one of the multiple different properties associated with the center tile;
    changing the tile display without changing a position of the center tile to include search results resulting from a search of the content catalog performed with the identified first search parameter, wherein the search results comprise recommended content;
    receiving an additional user input,
    wherein the additional user input includes a zooming in or a zooming out of the center tile of the tile display,
    wherein the zooming in includes a spanning out movement of a second finger and a third finger on the center tile, wherein the spanning out movement includes the second finger and the third finger moving apart in a linear direction, and
    wherein the zooming out includes a pinching movement of the second finger and the third finger on the center tile, wherein the pinching movement includes the second finger and the third finger moving toward one another in the linear direction;
    changing a focus level associated with the center tile to a more focused level to display lower level hierarchical content when the additional user input includes the zooming in of the center tile; and
    changing the focus level associated with the center tile to a less focused level to display higher level hierarchical content when the additional user input includes the zooming out of the center tile.

2. The method of claim 1, further comprising:
receiving second user input associated with selecting one of the multiple different linear axes of the tile display; and
displacing the tiles of the tile display, along the selected one of the multiple different linear axes and in a direction indicated by the second user input, to bring a different tile into position as the center tile of the tile display.

3. The method of claim 2, wherein the display unit comprises a touch screen display and wherein receiving the second user input comprises receiving a two-touch swiping input along the selected one of the multiple different linear axes of the tile display, wherein the two-touch swiping input includes a first touch that stays in position upon the touch screen display and a second touch that moves either towards, or away from, the position of the first touch along the selected one of the multiple different linear axes of the tile display.

4. The method of claim 1, further comprising:
receiving second user input associated with selecting one of the multiple different linear axes of the tile display; and
changing the tile display without changing a position of the center tile to display different search results based on the second user input.

5. The method of claim 4, wherein changing the tile display without changing a position of the center tile to display the different search results further comprises:
changing a focus level associated with the identified first search parameter.

6. The method of claim 1, further comprising:
receiving second user input associated with selecting one of the multiple different linear axes of the tile display;
identifying a second search parameter based on the selected one of the multiple different linear axes of the tile display;
presenting a plurality of different values for the identified second search parameter;
receiving third user input selecting one of the plurality of different values; and
assigning the selected one of the plurality of different values to the identified second search parameter.

7. The method of claim 6, wherein the display unit comprises a touch screen display and wherein receiving the second user input associated with selecting the one of the multiple different linear axes of the tile display comprises receiving a moving finger touch along the one of the multiple different linear axes of the tile display that starts at an outer edge of the touch screen display and moves inwards towards the center tile of the tile display.

8. The method of claim 1, further comprising:
receiving second user input associated with selecting one of the multiple different linear axes of the tile display;
identifying a second search parameter based on the selected one of the multiple different linear axes of the tile display;
presenting a plurality of different search parameters;
receiving third user input selecting one of the plurality of different search parameters, wherein the selected one of the plurality of different search parameters comprises a third search parameter; and
re-assigning the third search parameter, in place of the second search parameter, to the selected one of the multiple different linear axes of the tile display.

9. The method of claim 1, wherein the multiple different properties comprise a movie or series title, a season or series identifier, a series episode identifier, an original release date, a content time period, and a genre.

10. The method of claim 9, wherein the multiple different properties further comprise a cast and crew, a mood, a language, an identification of official awards and user ratings.

11. The method of claim 1, wherein the content comprises audio media, video media or audio and video media.

12. The method of claim 1, wherein the content comprises non-video or non-audio content.

13. The method of claim 1, wherein the display unit comprises a touch screen display and wherein receiving the first user input associated with selecting one of the multiple different linear axes of the tile display comprises receiving a moving finger touch along the one of the multiple different linear axes of the tile display.

14. The method of claim 13, wherein the moving finger touch comprises a single touch swiping input, or a two-touch swiping input.

15. The method of claim 14, wherein the two-touch swiping input comprises a two touch hold and swiping motion, a two-touch pinching motion, or a two-touch span out motion.

16. A device, comprising:
a touch screen display configured to display a tile display comprising a grid comprising multiple rows and columns of tiles, wherein each of the tiles represents an item of content or a group of items of content; and
a processor configured to:
associate multiple different linear axes with the tile display, wherein the multiple different linear axes intersect at a center tile of the tile display,
wherein the multiple different linear axes include a horizontal axis, a vertical axis, and diagonal axes,
wherein multiple different properties are associated with the center tile, and wherein each linear axis is associated with two search parameters;
receive user input associated with selecting one of the multiple different linear axes of the tile display,
wherein the user input includes a swipe in a first direction or a second direction along the one of the multiple different linear axes of the tile display, and
wherein the swipe in the first direction or the second direction includes a swipe of a first finger from a first location of the tile display to a second location of the tile display in the first direction or the second direction;
identify a first search parameter, for searching a content catalog, based on the selected one of the multiple different linear axes of the tile display, based on whether the swipe is in the first direction or the second direction, and based on at least one of the multiple different properties associated with the center tile;
cause the tile display displayed by the touch screen display to include search results resulting from a search of the content catalog performed with the identified first search parameter without changing a position of the center tile;
receive an additional user input,
wherein the additional user input includes a zooming in or a zooming out of the center tile of the tile display,
wherein the zooming in includes a spanning out movement of a second finger and a third finger on the center tile, wherein the spanning out movement includes the second finger and the third finger moving apart in a linear direction, and wherein the zooming out includes a pinching movement of the second finger and the third finger on the center tile, wherein the pinching movement includes the second finger and the third finger moving toward one another in the linear direction;

change a focus level associated with the center tile to a more focused level to display lower level hierarchical content when the additional user input includes the zooming in of the center tile; and change the search parameter associated with the center tile to a less focused level to display higher level hierarchical content when the additional user input includes the zooming out of the center tile.

17. The device of claim 16, wherein the search results comprise recommended content and wherein the content comprises audio media, video media or audio and video media.

18. The device of claim 16, wherein receiving the user input associated with selecting one of the multiple different linear axes of the tile display comprises receiving, via the touch screen display, a moving finger touch along the one of the multiple different linear axes of the tile display, wherein the moving finger touch comprises a single touch swiping input, or a two-touch swiping input.

19. A non-transitory computer-readable medium containing instructions executable by at least one processor, the computer-readable medium comprising instructions for:

providing a display of a tile display comprising a grid comprising multiple rows and columns of tiles upon a display unit of a device, wherein each of the tiles represents an item of content or a group of items of content, and wherein the content comprises audio media, video media or audio and video media;

associating multiple different linear axes with the tile display, wherein the multiple different linear axes intersect at a center tile of the tile display, wherein the multiple different linear axes include a horizontal axis, a vertical axis, and diagonal axes, wherein multiple different properties are associated with the center tile, and wherein two different search parameters are associated with each of the multiple different linear axes of the tile display;

receiving user input associated with selecting one of the multiple different linear axes of the tile display, wherein the user input includes a swipe in a first direction or a second direction along the one of the multiple different linear axes of the tile display, wherein the swipe in the first direction or the second direction includes a swipe of a first finger from a first location of the tile display to a second location of the tile display in the first direction or the second direction;

identifying a search parameter, for searching a content catalog, based on the selected one of the multiple different linear axes of the tile display, based on whether the swipe is in the first direction or the second direction, and based on at least one of the multiple different properties associated with the center tile;

changing the tile display without changing a position of the center tile to include search results resulting from a search of the content catalog performed with the identified search parameter, wherein the search results comprise recommended content;

receiving an additional user input, wherein the additional user input includes a zooming in or a zooming out of the center tile of the tile display, wherein the zooming in includes a spanning out movement of a second finger and a third finger on the center tile, wherein the spanning out movement includes the second finger and the third finger moving apart in a linear direction, and wherein the zooming out includes a pinching movement of the second finger and the third finger on the center tile, wherein the pinching movement includes the second finger and the third finger moving toward one another in the linear direction;

changing a focus level associated with the center tile to a more focused level to display lower level hierarchical content when the additional user input includes the zooming in of the center tile; and changing the focus level associated with the center tile to a less focused level to display higher level hierarchical content when the additional user input includes the zooming out of the center tile.

20. The non-transitory computer-readable medium of claim 19, wherein the search results comprise recommended content and wherein the content comprises audio media, video media, or audio and video media.

* * * * *